United States Patent [19]

Yoshida et al.

[11] Patent Number: 5,361,332
[45] Date of Patent: Nov. 1, 1994

[54] METHOD OF COMMONLY USING FONT INFORMATION FOR OUTPUTTING INFORMATION IN A SYSTEM HAVING A PLURALITY OF INFORMATION PROCESSING DEVICES

[75] Inventors: Masayuki Yoshida, Yokohama; Keiko Nakanishi, Tokyo, both of Japan

[73] Assignee: Canon Kabushiki Kaisha, Tokyo, Japan

[21] Appl. No.: 772,953

[22] Filed: Oct. 8, 1991

[30] Foreign Application Priority Data

Oct. 9, 1990 [JP] Japan .................................. 2-272605

[51] Int. Cl.$^5$ .......................................... G06K 15/00
[52] U.S. Cl. .................................... 395/114; 395/110
[58] Field of Search ............... 395/101, 110, 112, 114, 395/150-151, 165, 500; 345/141-144; 400/70, 72, 61-62

[56] References Cited

U.S. PATENT DOCUMENTS

| | | | |
|---|---|---|---|
| 4,004,277 | 1/1977 | Gavril | 395/114 |
| 4,594,674 | 6/1986 | Boulia | 395/110 |
| 4,686,525 | 8/1987 | Naguta | 340/735 |
| 4,754,428 | 6/1988 | Schultz et al. | |

FOREIGN PATENT DOCUMENTS 0119396  9/1984  European Pat. Off. .
0123806 11/1984  European Pat. Off. .
0330796  9/1989  European Pat. Off. .

OTHER PUBLICATIONS

*IBM Technical Disclosure Bulletin,* "Compatible Scheme to Query Printer Capabilities", vol. 32, No. 4A, pp. 381-383, Sep. 1989.

*Primary Examiner*—Arthur G. Evans
*Attorney, Agent, or Firm*—Fitzpatrick, Cella, Harper & Scinto

[57] ABSTRACT

An information transmitting method for an information processing device connected to other information processing devices, the information transmitting method including the steps of: a step of instructing font information for transmitting information; a step in which, if font information about the instructed font is not stored in the information processing device, a discrimination is made whether or not font information about the instructed font is stored in the other information processing devices connected; a step in which, if a discrimination is made as a result of the discrimination that there are information processing devices in which instructed font information is stored, one information processing device is selected from the information processing devices; a step of loading instructed font information from selected information processing device into the device; and a step of transmitting information in accordance with loaded font information.

40 Claims, 17 Drawing Sheets

FIG. 4

WORK STATION A

| DEVICE NAME | FM CLASSIFICATION | DEVICE CLASSIFICATION | FONT TYPE |
|---|---|---|---|
| WORK STATION E | A | WS | FINE-FACED MING DYNASTY STYLE, GOTHIC STYLE |
| WORK STATION F | A | WS | FINE-FACED MING DYNASTY STYLE, SQUARE STYLE OF CHINESE CHARACTER WRITING |
| WORK STATION G | A | WS | BOLD-FACED MING DYNASTY STYLE |
| WORK STATION H | B | WS | FINE-FACED MING DYNASTY STYLE, GOTHIC STYLE |
| WORK STATION I | B | WS | BOLD-FACED MING DYNASTY STYLE |
| WORK STATION J | C | WS | BOLD-FACED MING DYNASTY STYLE |
| WORK STATION B | B | WS | NONE |
| WORK STATION C | C | WS | NONE |
| WORK STATION D | D | WS | NONE |
| PRINTER A | A | PR | FINE-FACED MING DYNASTY STYLE, GOTHIC STYLE |
| PRINTER B | A | PR | FINE-FACED MING DYNASTY STYLE, TEXTBOOK STYLE |
| PRINTER C | A | PR | BOLD-FACED MING DYNASTY STYLE |
| PRINTER D | B | PR | FINE-FACED MING DYNASTY STYLE, GOTHIC STYLE |
| PRINTER E | B | PR | BOLD-FACED MING DYNASTY STYLE |
| PRINTER F | E | PR | BOLD-FACED MING DYNASTY STYLE |

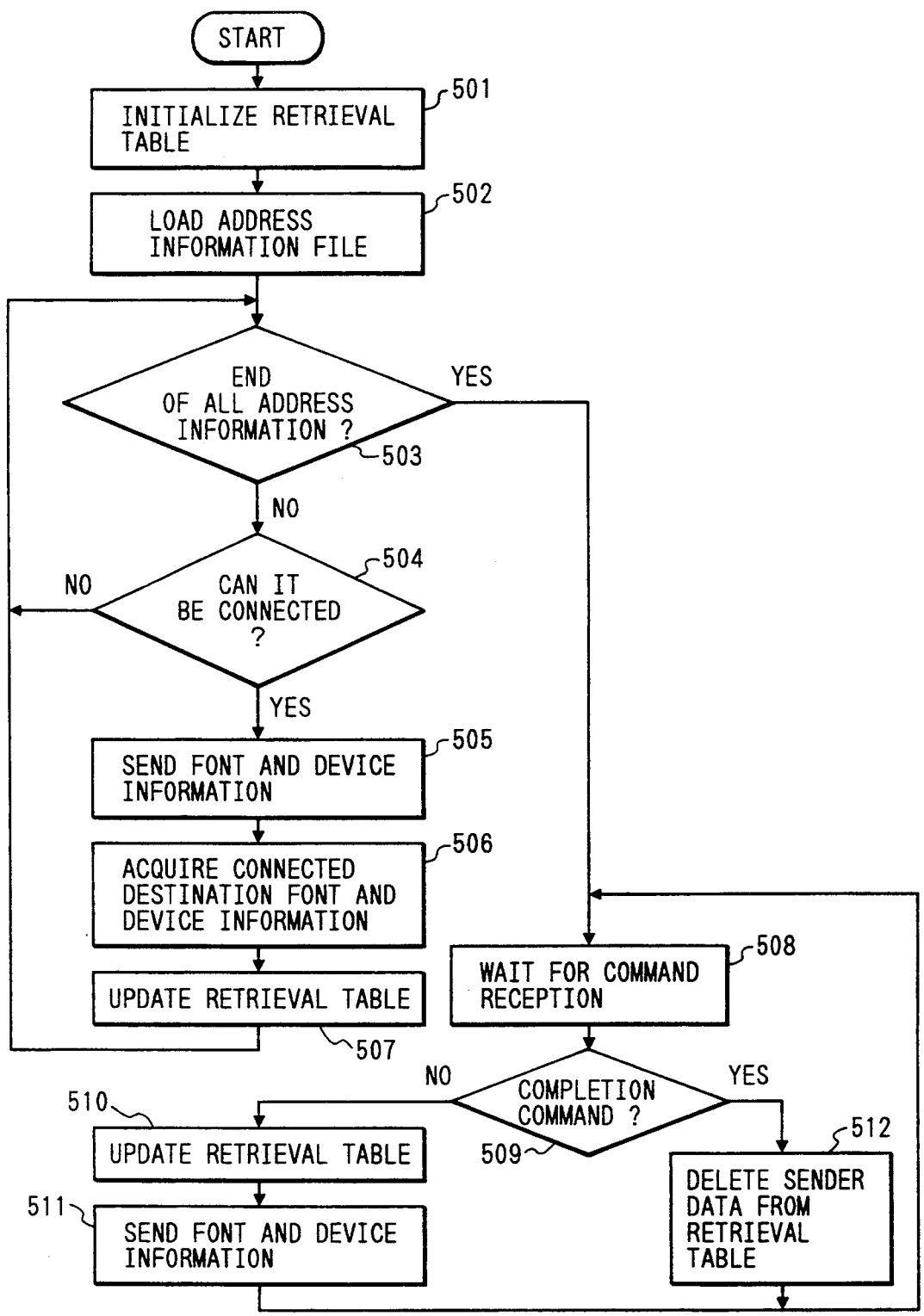

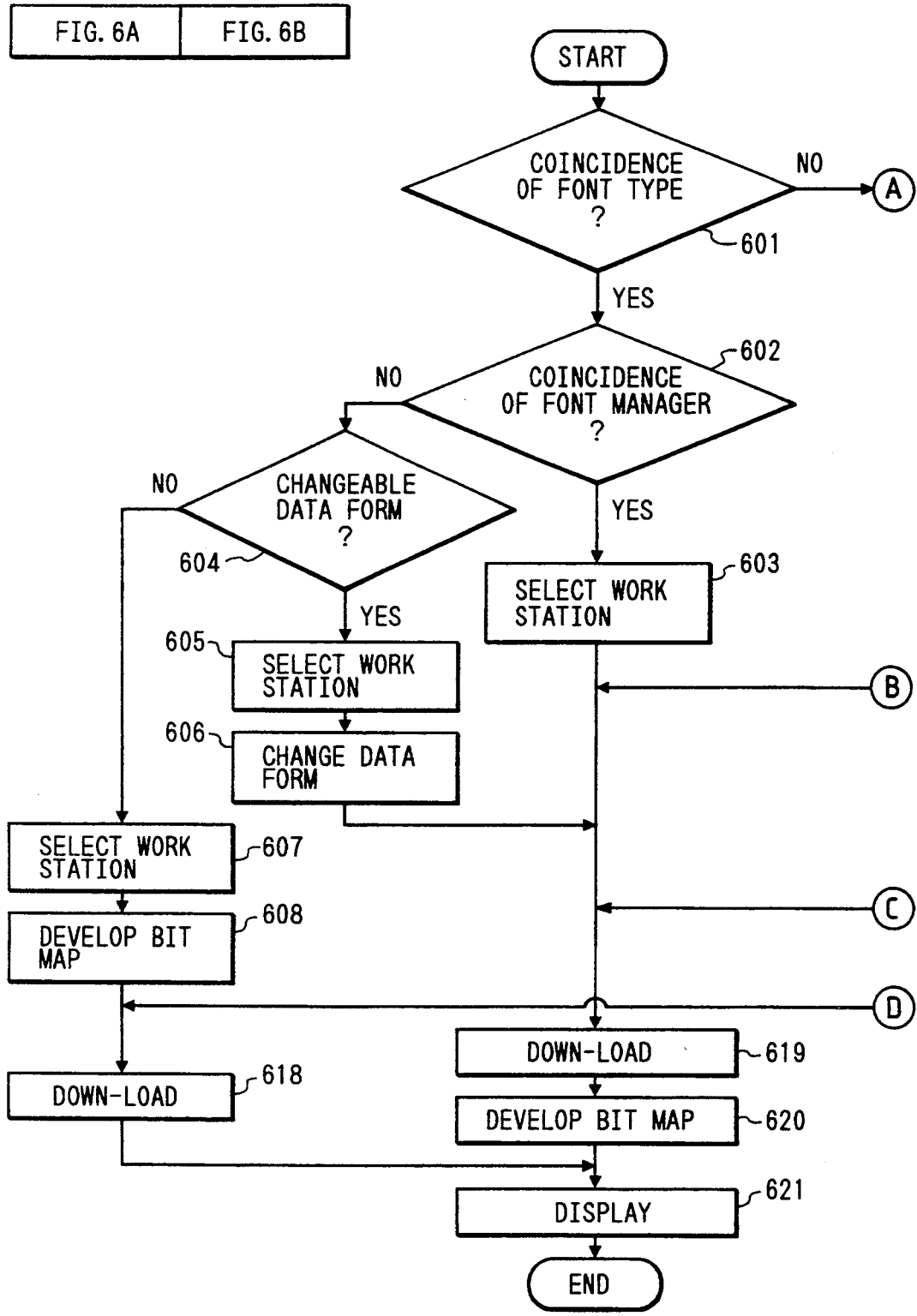

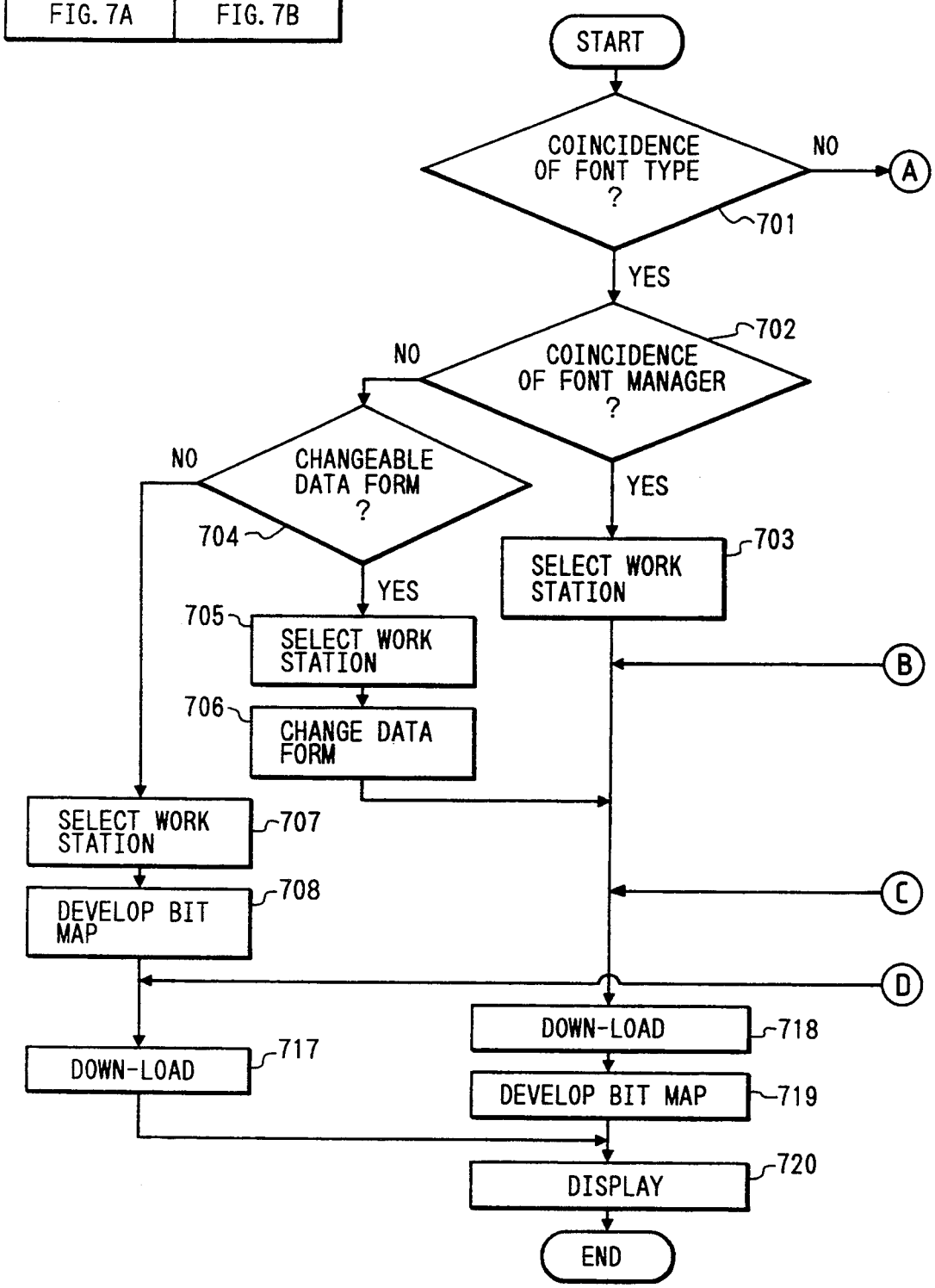

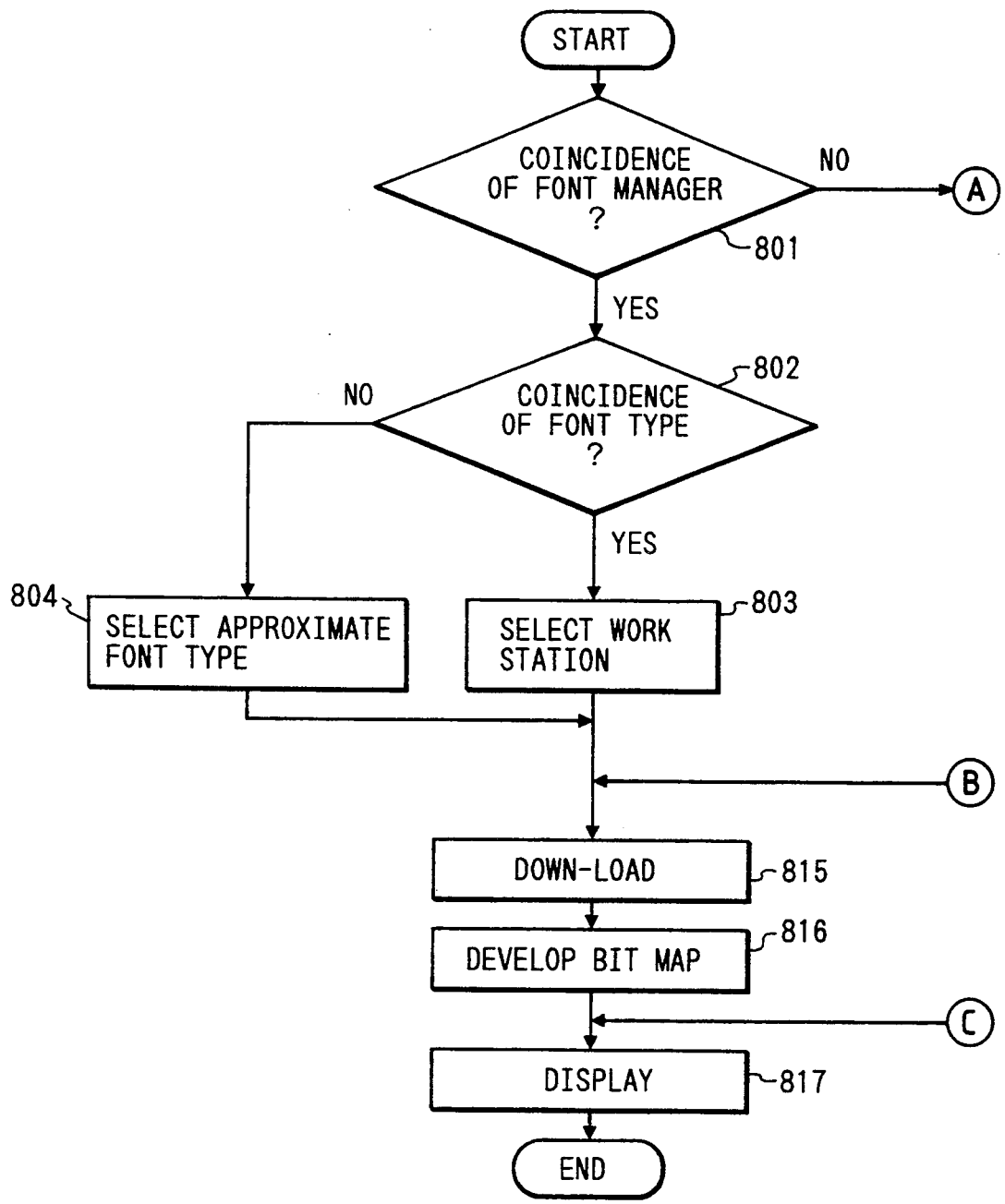

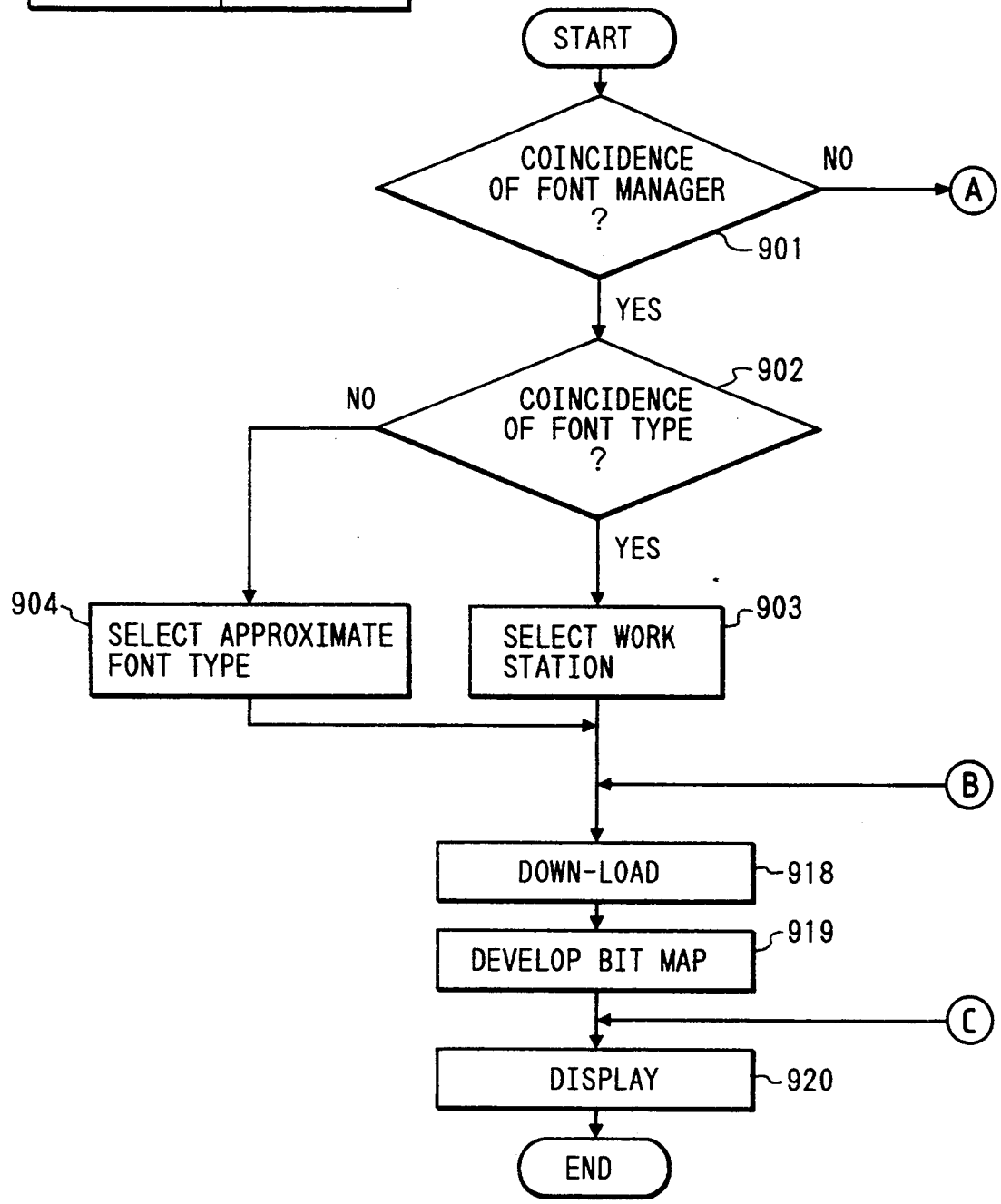

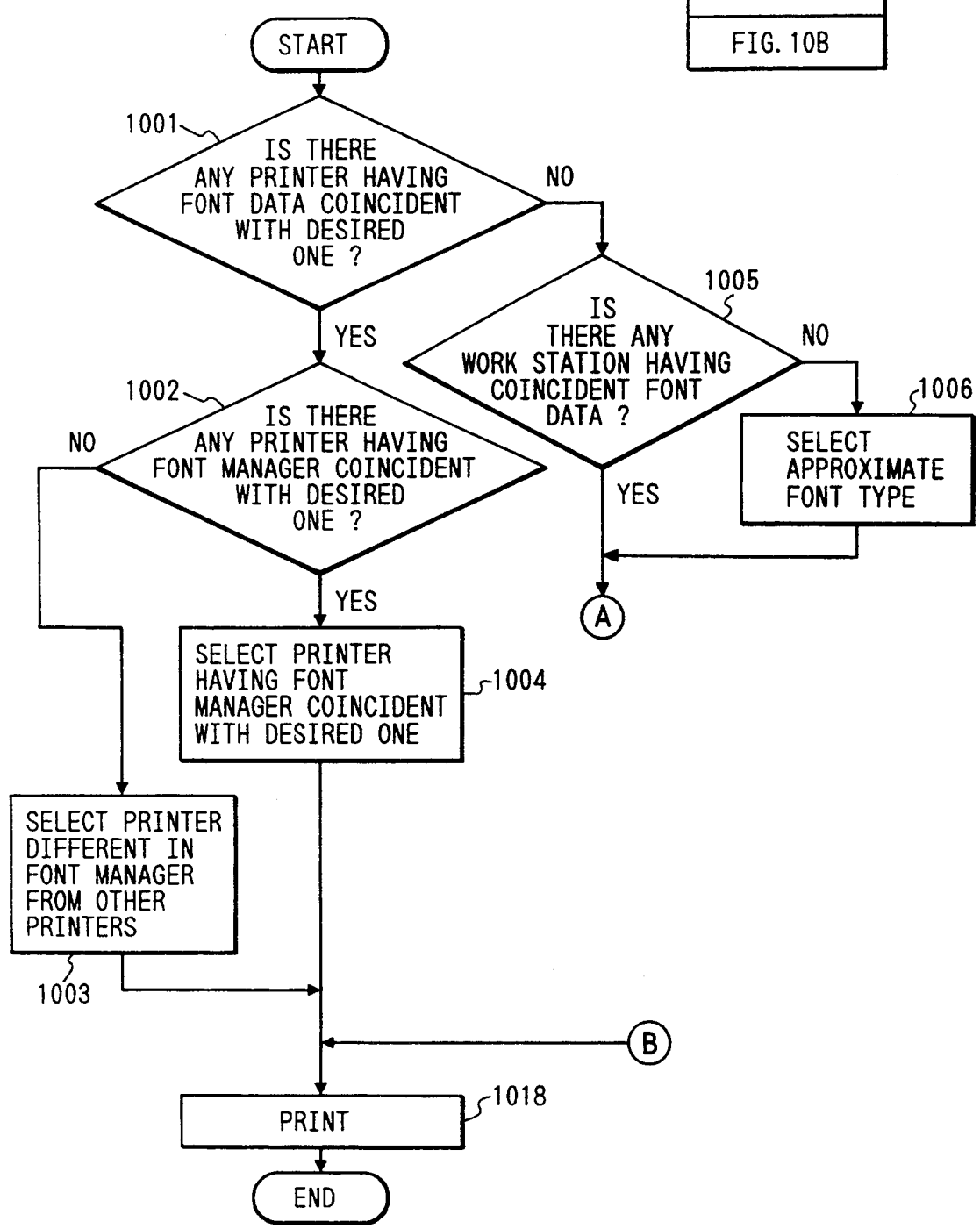

| FROM \ TO | A<br>3RD BÉZIER | B<br>STRAIGHT LINE | C<br>3RD B SPLINE | D<br>2ND BÉZIER | E<br>CIRCULAR ARC |
|---|---|---|---|---|---|
| A  3RD BÉZIER |  | ○ | ◎ | × | × |
| B  STRAIGHT LINE | ◎ |  | ◎ | ◎ | ◎ |
| C  3RD B SPLINE | ◎ | ○ |  | × | × |
| D  2ND BÉZIER | ◎ | ○ | ◎ |  | × |
| E  CIRCULAR ARC | × | ○ | × | × |  |

FIG. 14

| FONT NAME | FM CLASSIFICATION | DEVICE NAME |
|---|---|---|
| FINE-FACED MING DYNASTY STYLE | A | WORK STATION E |
| MEDIUM FINE-FACED MING DYNASTY STYLE | A | WORK STATION F |
| MEDIUM-FACED MING DYNASTY STYLE | | NONE |
| MEDIUM BOLD-FACED MING DYNASTY STYLE | | NONE |
| BOLD-FACED MING DYNASTY STYLE | B | WORK STATION G |

FIG. 15

| FONT NAME | FM CLASSIFICATION | DEVICE NAME |
|---|---|---|
| FINE-FACED MING DYNASTY STYLE | A | WORK STATION E |
| TEXTBOOK STYLE | A | WORK STATION F |
| SQUARE STYLE | B | WORK STATION G |

METHOD OF COMMONLY USING FONT INFORMATION FOR OUTPUTTING INFORMATION IN A SYSTEM HAVING A PLURALITY OF INFORMATION PROCESSING DEVICES

BACKGROUND OF THE INVENTION

1. Field of the Invention

The present invention relates to an information processing apparatus having common character font data via a network.

2. Related Background Art

A variety of office tools, for example, personal computers, office computers, facscimile machines, word processors and the like have been widely used in offices. Accordingly, a LAN must be created which is capable of connecting above-described equipment and personal work stations to one another to combine information in vertical and horizontal structures for the purpose of realizing a total office system and the LAN is further required to serve on an open and transmissive communication equipment. In order to meet the above-described requirement, a network OS (office system) if available.

The above-described network OS is capable of realizing a dispersed information process structured on the basis of a PC (Personal Computer) network so that information can be supplied/received to and from a host system or a UNIX work station. A protocol, which can be commonly used regardless of the equipment type, is loaded into each work station and the servers so that sharing of data files, connections between different kind equipment and sharing of peripheral equipment can easily be realized.

However, the following problem to arise in the above-described conventional structure because the content of data cannot be administrated:

In a case where a required font data is not present on the operator's own work station, the operator must always issue a command to other work stations or servers (printers) so as to select optimum font data in order to load down the font data required for the own work station.

SUMMARY OF THE INVENTION

An object of the present invention is to provide an information processing system arranged in such a manner that, in a case where font data is not present on the operator's own work station, whether or not the same is present in other work stations or servers (printers) and font data is downloaded if the same is present.

Another object of the present invention is to provide an information processing system arranged in such a manner that, in a case where font data is not present in the operator's own work station, the system checks whether or not the same is present in other work stations or servers (printers) and optimum font data, which can be used in place of the required font data, is selected from available font data so as to download the font data thus-selected if the required font data is not present.

Another object of the present invention is to provide an information processing system arranged in such a manner that, in a case where an information processing device stores the type of font data stored in other information processing device connected to the information processing device in the system, the information processing device determines available font data on the basis of the contents stored in the information processing device.

According to one aspect, the present invention which achieves these objectives relates to an information transmitting method for an information processing device connected to other information processing devices, the information transmitting method including a step of instructing font information for transmitting information; a step in which, if font information about the instructed font is not stored in the information processing device, a discrimination is made whether or not font information about the instructed font is stored in the other information processing devices connected; a step in which, if a discrimination is made as a result of the discrimination that there are information processing devices in which instructed font information is stored, one information processing device is selected from the information processing devices; a step of loading instructed font information from the selected information processing device to the device; and a step of transmitting information in accordance with loaded font information.

According to another aspect, the present invention which achieves these objectives relates to an information printing method for an information processing device connected to a plurality of information processing devices including one or more printing devices, the information printing method including a step of instructing font information for printing information by the printing device; a step in which, if font information about the instructed font is not stored in the printing device and the information processing device, a discrimination is made whether or not the same is stored in the other information processing devices connected; a step in which, if a discrimination is made that there are information processing devices in each of which instructed font information is stored, one information processing device is selected from the information processing devices; a step of loading instructed font information from the selected information processing device into the printing device; and a step of printing information in accordance with loaded font information.

According to still another aspect, the present invention which achieves these objectives relates to an information printing method for an information processing device connected to a plurality of printing devices, the information printing method including a step of instructing a font for printing information; a step of discriminating whether or not font information about the instructed font is stored in each printing device connected thereto; a step in which, if a discrimination is made that instructed font information is stored in one or more printing devices, one printing device is selected from the printing devices; and a step of transmitting a print from the selected printing device.

According to another aspect, the present invention which achieves these objectives relates to an information transmitting method for an information processing device connected to other information devices, the information transmitting method including a step of instructing font information for transmitting information; a step in which, if font information about the instructed font is not stored in the information processing device, a discrimination is made whether or not font information about the instructed font is stored in the other information processing devices connected; a step in which, if a discrimination is made as a result of the discrimination that there is no information processing device in which instructed font information is stored, an information processing device which stores optimum font information which can be used in place of instructed font information is selected; a step in which optimum font information is loaded from the selected information processing device to the device; and a step in which information is transmitted in accordance with loaded font information.

According to another aspect, the present invention which achieves these objectives relates to an information printing method for an information processing device connected to a plurality of information processing devices including one or more printing devices, the information printing method including a step of instructing font information for transmitting information in the form of a print; a step in which, if font information about the instructed font is not stored in the information processing device and the printing device which transmits information, a discrimination is made whether or not font information about the instructed font is stored in the other information processing devices connected; a step in which, if a discrimination is made as a result of the discrimination that there is no information processing device in which instructed font information is stored, an information processing device which stores optimum font information which can be used in place of instructed font information is selected; a step in which optimum font information is loaded from the selected information processing device to the printing device which transmits information; and a step in which information is printed in accordance with loaded font information.

According to another aspect, the present invention which achieves these objectives relates to an information printing method for an information processing device connected to a plurality of printing devices, the information printing method including a step of instructing a font for transmitting information; a step in which a discrimination is made whether or not font information about the instructed font is stored in each printing device; a step in which, if a discrimination is made as a result of the discrimination that there is no printing device in which instructed font information is stored, a printing device which stores optimum font information which can be used in place of instructed font information is selected; and a step in which a print is transmitted by the selected printing device.

According to another aspect, the present invention which achieves these objectives relates to an information transmitting method for an information processing device connected to other information processing devices and capable of creating characters of a font by developing font information, the information transmitting method including a step of instructing a font for transmitting information; a step in which, if font information about the instructed font is not stored in the information processing device, a discrimination is made whether or not font information about the instructed font is stored in the other information processing devices connected; a step of discriminating whether or not the development format of each information processing device, which has been discriminated that instructed font information is stored therein, coincides with the development format of the information processing device; a step of selecting one information processing device from the information processing devices, which have been discriminated that their development formats coincides with that of the information processing device; and a step of loading instructed font information from the selected information processing device to the information processing device.

According to another aspect, the present invention which achieves these objectives relates to an information printing method for an information processing device connected to a plurality of information processing devices including one or more printing devices, the information printing method including a step of instructing font information for transmitting information in the form of a print; a step in which, if font information about the instructed font is not stored in the information processing device and the printing device which transmits the information, a discrimination is made whether or not font information about the instructed font is stored in the other information processing devices connected; a step of discriminating whether or not the development format of each information processing device, which has been discriminated that instructed font information is stored therein, coincides with the development format of the printing device; a step of selecting one information processing device from the information processing devices the development format of each of which coincides with that of the printing device in a case where there are information processing devices the development format of which coincides with that of the printing device; a step of loading instructed font information from the selected information processing device to the printing device; and a step of printing information in accordance with loaded font information.

According to another aspect, the present invention which achieves these objectives relates to an information printing method for an information processing device connected to a plurality of printing devices, the information printing method including a step of instructing font information for transmitting information in the form of a print; a step of discriminating whether or not font information about the instructed font is stored in each of the printing devices or the information device; a step in which, if the instructed font is not stored in the information processing device or each of the printing devices, a discrimination is made whether or not there are devices each of which stores instructed font information among the other information processing devices connected; a step in which, if a discrimination is made that there are the information processing devices which store instructed font information, a discrimination is made whether or not there are combinations of the devices and the printing devices having the same development format; a step of selecting a pair composed of the information processing device and the printing device from the combinations in a case where there are combinations in which the information processing device and the printing device have the same development format; a step of loading font information of the selected information processing device into the selected printing device; and a step of printing information in accordance with loaded font information.

According to another aspect, the present invention which achieves these objectives relates to an information transmitting method for an information processing device connected to other information processing devices and capable of creating characters of a font by developing font information, the information transmitting method including a step of instructing a font for transmitting information; a step in which, if font information about the instructed font is not stored in the information processing device, a discrimination is made whether or not font information about the instructed font is stored in the other information processing devices connected; a step of discriminating whether or not the development format of each information processing device, which has been discriminated that instructed font information is stored therein, coincides with the development format of the information processing device and discriminating whether or not font information to be developed in accordance with the development format can be converted into a form which can be developed in accordance with the development format of the information processing device; a step in which, if a discrimination is made that there is no information processing device which stores instructed font information and which has the same development format as that of the information processing device but there are information processing devices the development format of each of which can be converted, one information processing device is selected from the information processing devices having font information which can be converted; a step of converting instructed font information of the selected information processing device into a form which can be developed in accordance with the development format of the device; a step of loading converted font information; and a step of transmitting information in accordance with loaded font information.

According to another aspect, the present invention which achieves these objectives relates to an information printing method for an information processing device connected to a plurality of information processing devices including one or more printing devices, the information printing method including a step of instructing font information for transmitting information in the form of a print; a step in which, if font information about the instructed font is not stored in the information processing device and the printing device which transmits information, a discrimination is made whether or not the same is stored in the other information processing devices connected; a step of discriminating whether or not the development format of each of the information processing devices which have been discriminated that they store instructed font information coincides with the development format of the printing device; a step of discriminating whether or not font information to be developed in accordance with the development method of each of the information processing devices which have been discriminated that they store instructed font information can be converted into a form which can be converted in accordance with the development format of the printing device; a step of selecting one information processing device from the information processing devices the development format of which can be converted when two discriminations are made that no information device having the same development format as that of the printing device is present among the other information processing devices which have been determined that they store instructed font information and there is an information processing device having the development format which can be converted; a step of converting, in the selected information processing device, instructed font information into a form which can be developed in accordance with the development format of the information processing device; a step of loading the converted font information into the printing device; and a step of printing information in accordance with loaded font information.

According to another aspect, the present invention which achieves these objectives relates to an information printing method for an information processing device connected to a plurality of printing devices, the information printing method including a step of instructing font information for transmitting information in the form of a print; a step of discriminating whether or not font information about the instructed font is stored in the printing devices connected; a step of discriminating whether or not a device which stores instructed font information is present in the information processing device or the other information processing devices connected in a case where a discrimination is made that instructed font information is not stored in any printing device; a step of discriminating whether or not there is a pair which is composed of the device and the printing device having the same font information developing format in the devices which store instructed font information and the printing devices; a step of selecting one pair composed of the information processing device and the printing device from the corresponding pairs when two discriminations are made that there is no combination each of which has the same development format and there are combinations having font information which can be converted in such a manner that font information is developed; a step of converting instructed font information into a form which can be developed by the selected printing devices in the selected information processing device; a step of loading converted font information into the selected printing device; and a step of printing information by the printing device.

According to another aspect, the present invention which achieves these objectives relates to an information transmitting method for an information processing device connected to other information processing devices and capable of creating characters of a font by developing font information, the information transmitting method including a step of instructing a font for transmitting information; a step in which, if font information of the instructed font is not stored in the information processing device, a discrimination is made whether or not font information about the instructed font is stored in the other information processing devices connected; a step in which, if a discrimination is made as a result of the discrimination that there is no information processing device which stores instructed font information, a discrimination of an information processing device having an optimum font information which can be used in place of instructed font information is made; a step in which a determination is made whether or not the development format of the information processing device which has been discriminated as a result of the discrimination that it stores the optimum font information coincides with the development format of the first information processing device; a step in which, if a discrimination is made as a result of the discrimination that the development format coincides with that of the first information processing device, the optimum font information is loaded from the information processing device to the first information processing device; and a step of transmitting information in accordance with loaded font information.

According to another aspect, the present invention which achieves these objectives relates to an information printing method for an information processing device connected to a plurality of information processing device including one or more printing devices, the information printing method including a step of instructing font information for transmitting information in the form of a print; a step in which, if font information about the instructed font is not stored in the information processing device and the printing device which transmits information, a discrimination is made whether or not the same is stored in the other information processing device connected; a step in which, if a discrimination is made as a result of the discrimination that there is no information processing device which stores instructed font information, an information processing device having an optimum font information which can be used in place of instructed font information is discriminated; a step in which a discrimination is made whether or not the development format of the information processing device which has been determined as a result of the discrimination that it stores the optimum font information coincides with the development format of the printing device; a step of loading the optimum font information from the information processing device into the printing device if a discrimination is made as a result of the discrimination that the development format coincides with that of the printing device; and a step of printing information in accordance with loaded font information.

According to another aspect, the present invention which achieves these objectives relates to an information printing method for an information processing device connected to a plurality of printing devices, the information printing method including a step of instructing font information for transmitting information in the form of a print; a step of discriminating whether or not font information about the instructed font is stored in each printing device or own device; a step in which, if a discrimination is made as a result of the discrimination that instructed font information is not stored in the own device and each of the printing devices, a discrimination is made whether or not there is a device which stores instructed font information in the other information processing devices connected; a step in which, if a discrimination is made as a result of the discrimination that there is no information processing device which stores instructed font information, an information processing device having an optimum font information which can be used in place of instructed font information is discriminated; a step in which a discrimination is made whether or not there are printing devices the development format of which coincides with the development format of the information processing device which has been discriminated that it stores the optimum font information as a result of the discrimination; a step of selecting one printing device from the printing devices if the printing device the development format of which coincides with the information processing device is present, a step of loading the optimum font information from the information processing device into the selected printing device; and a step of printing information in accordance with loaded font information.

According to another aspect, the present invention which achieves these objectives relates to an information transmitting method for an information processing device connected to other information processing devices, the information transmitting method including a step of recognizing font information stored in each of the other information processing devices connected by communicating with the other information processing devices connected; a step of storing the type of font information stored in the other devices obtained by the communication; a step of instructing a font for transmitting information; a step in which, in a case where font information about the instructed font is not stored in the first information processing device, a discrimination is made whether or not the same is stored in the other information processing devices connected in accordance with the type of stored font information; a step in which, if a discrimination is made that as a result of the discrimination that there is an information processing device which stores instructed font information, one information processing device is selected from the information processing devices; a step of loading instructed font information from the selected information processing device; and a step of transmitting information in accordance with loaded font information.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 illustrates an example of a retrieval table;

FIG. 5 is a flow chart which illustrates an operation of processing the retrieval table;

FIGS. 6 to 10 including FIGS. 6, 6A and 6B, 7, 7A and 7B, 8, 8A and 8B, 9, 9A and 9B, and 10, 10A and 10B, are flow charts which illustrate an operation to be performed in a case where a required font is not present;

FIG. 14 illustrates an example of a family table; and

FIG. 15 illustrates an example of a friend table.

DESCRIPTION OF THE PREFERRED EMBODIMENTS

Preferred embodiments of the present invention will now be described with reference to the drawings.

Figure 1:
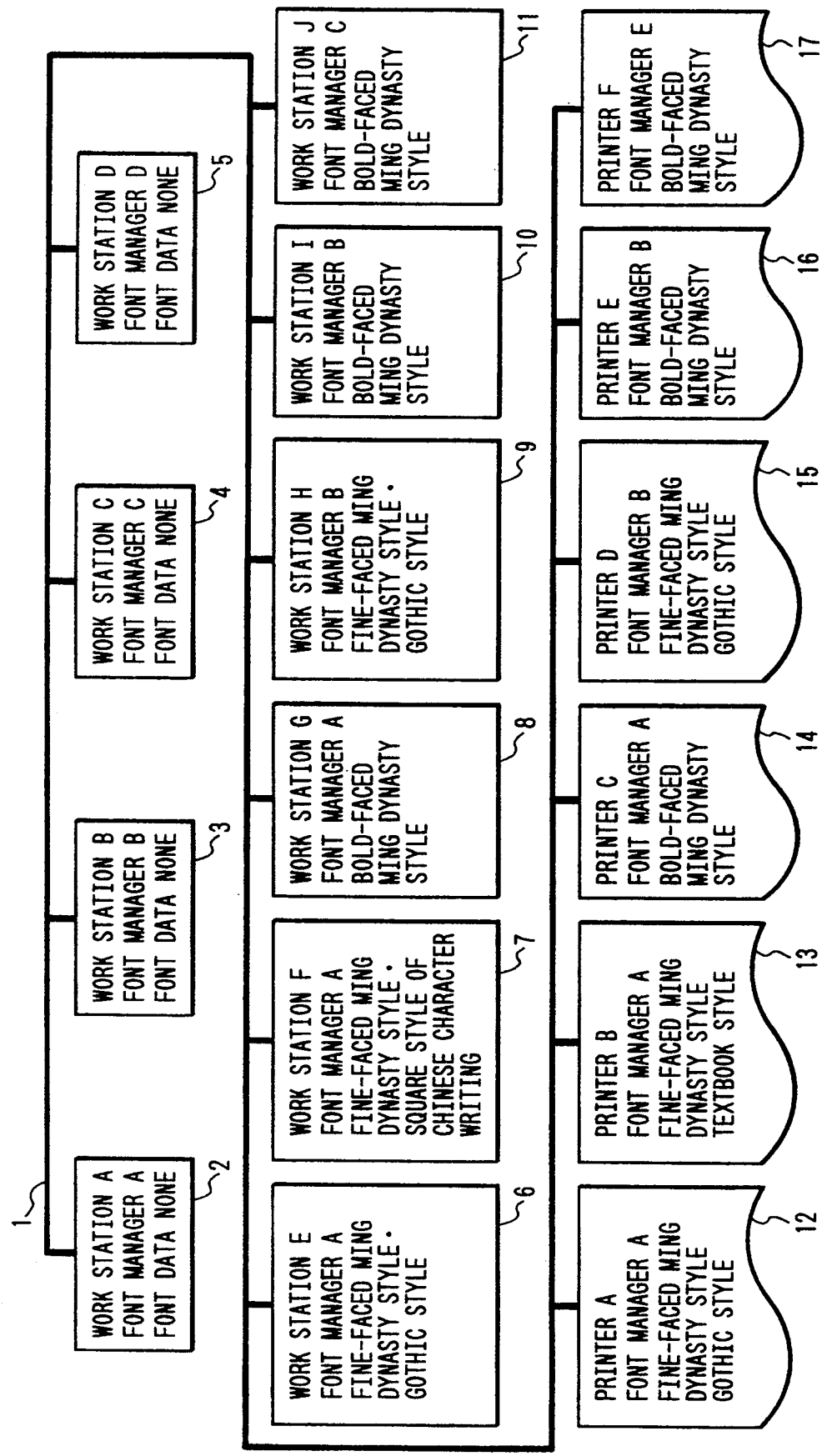
FIG. 1 illustrates an example of the system structure according to the present invention.

FIG. 1 illustrates an example of the system structure according to the present invention.

Referring to FIG. 1, reference numeral 1 represents a LAN cable for connecting work stations and printers, 2 to 11 represent work stations A to J and 12 to 17 represent printers A to D.

The work stations A to D respectively include font managers A to D for developing an outline font into a bit map font.

Each of the work stations E to G includes the font manager A for developing the outline font into the bit map font. The work station E has outline font data of a fine-faced Ming dynasty style and a Gothic style to be developed by the font manager A into the bit map font.

The work station G has outline font data of a bold-faced Ming dynasty style to be developed by the font manager A into the bit map font.

On the other hand, each of the work stations H to I includes the font manager B for developing the outline font into the bit map font. The work station H has outline font data of the fine-faced Ming dynasty style and the Gothic style to be developed by the font manager A into the bit map font. The work station I has outline font data of the bold-faced Ming dynasty style to be developed by the font manager A into the bit map font.

The work station J includes the font manager C for developing the outline font into the bit map font and outline font data of bold-faced Ming dynasty style to be developed into the bit map font by the font manager C.

Furthermore each of the printers A and B includes the font manager A for developing the outline font into the bit map font. The printer A has the outline font of the fine-faced Ming dynasty style and the Gothic style to be developed by the font manager A into the bit map font. The printer B includes the outline font data of the fine-faced Ming dynasty style and a text book style to be developed by the font manager A into the bit map font. The printer 14 includes the outline font data of the bold-faced Ming dynasty style to be developed into the bit map font by the font manager A.

Each of the printers D and E includes the font manager B for developing the outline font into the bit map font. The printer D includes the outline font data of the fine-faced Ming dynasty style and the Gothic style to be developed into the bit map font by the font manager B. The printer E includes the outline font data of the bold-faced Ming dynasty style to be developed into the bit map font by the font manager B.

The printer F includes the font manager E for developing the outline font into the bit map font and the outline font of the bold-faced Ming dynasty style to be developed into the bit map font by the font manager B.

Figure 2:
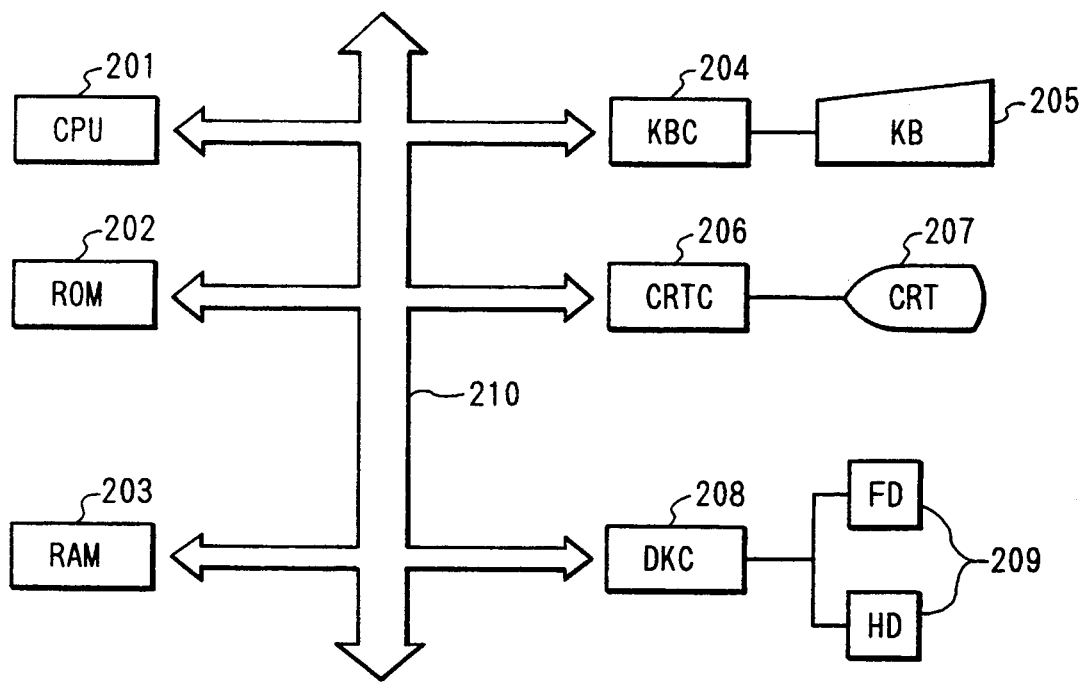
FIG. 2 is a block diagram view which illustrates the structure of a work station according to an embodiment of the present invention.

FIG. 2 is a block diagram which illustrates the basic structure of the work station according to the present invention.

Referring to FIG. 2, reference numeral 201 represents a CPU, that is, a central processing unit for controlling the overall operations of the apparatus and performing calculations. Reference numeral 202 represents a ROM, that is, a read only memory which serves as a region for storing a system starting program, character pattern data, a font manager program and the like. The character pattern data is stored in a data format which is adaptable to the font manager program. The above-described ROM 202 may be arranged in such a manner that its portion or the overall body is formed into a cartridge so as to be easily extended or changed. Reference numeral 203 represents a RAM, that is, a random access memory which is a data storage region having no limit when it is used, into which a program and data required to a corresponding operation of a variety of operations are loaded and in which the subject operation is executed. Reference numeral 204 represents a KBC, that is, a keyboard control portion which receives data supplied by KB, that is, keyboard 205 and transmits data to the CPU 201. Reference numeral 206 represents a CRTC, that is, a display control portion and 207 represents a CRT, that is, a display device. The CRT 207 displays data supplied from the CRTC 206. Reference numeral 209 represents an external storage device such as an FD, that is, a floppy disk device or an HD, that is, a hard disk device which stores the program and data so as to be subjected to a reference or from which it is loaded into the RAM 203. Reference numeral 208 represents a DKC, that is, a disk control portion for controlling, for example, data transmission to the external storage device 209. Reference numeral 210 represents a system bus which serves as a transmission passage through which data is transmitted between the above-described component elements.

Figure 3:
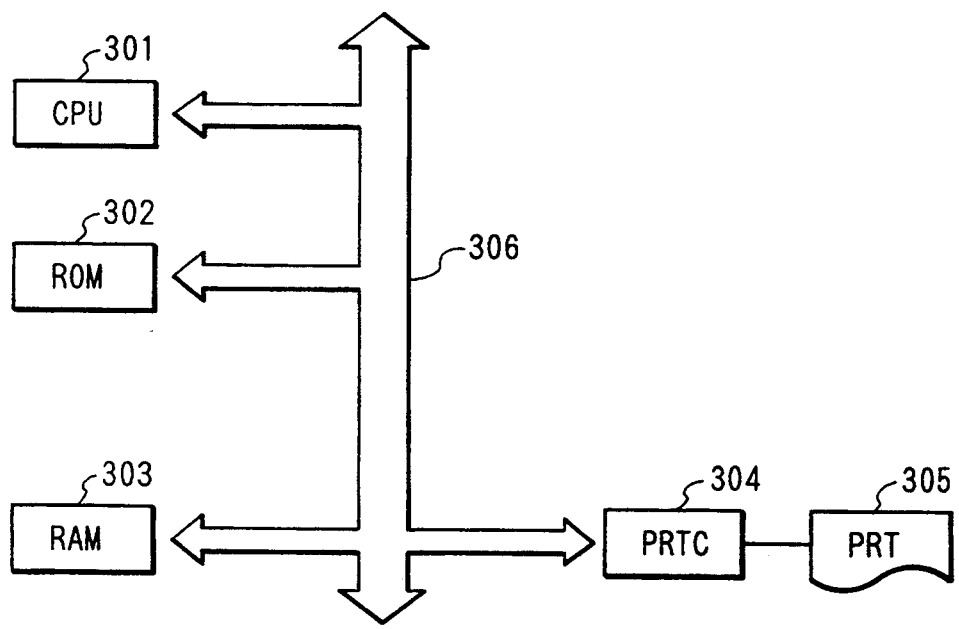
FIG. 3 is a block diagram which illustrates a printer according to the embodiment of the present invention.

FIG. 3 is a block diagram which illustrates the basic structure of the printer according to the present invention.

Referring to FIG. 3, reference numeral 301 represents a CPU, that is, a central processing unit for controlling the overall operations of the apparatus and performing calculations. Reference numeral 302 represents a ROM, that is, a read only memory which serves as a region for storing a system starting program, character pattern data, a font manager program and the like. The character pattern data is stored in a data format which is adaptable to the font manager program. The above-described ROM 302 may be included in the body of the printer or formed into a detachable cartridge or the 1 like. Reference numeral 303 represents a RAM, that is, a random access memory which is a data storage region having no limit when it is used, into which a program and data required to a corresponding operation of a variety of operations are loaded and in which the subject operation is executed. Reference numeral 305 represents a PRT, that is, a printer device and 304 represents a PRTC, that is, a printer control portion for controlling the PRT 305. Reference numeral 306 represents a system bus which serves as a transmission passage through which data is transmitted between the above-described component elements.

According to this embodiment, in a case where a certain work station uses a certain font data which is not present on the work station, the font data is loaded down from another work station in conformity with a predetermined rule.

When the work station A of the system structured as shown in FIG. 1 displays data by using the fine-faced Ming dynasty style, the font data of the fine-faced Ming dynasty style is loaded from the work station E as an operation corresponding to a default because the work station A has no fine-faced Ming dynasty style font data before the fine-faced Ming dynasty style font data is developed into the bit map in the work station A.

In a case where the work station E is not connected to the LAN due to, for example, a fact that the power switch is switched off, the fine-faced Ming dynasty style font data is loaded from the work station F so as to be developed into the bit map in the work station A.

In a case where data is displayed by using the square style in the work station A, the square style is not present in the work station E but the same is present in only the work station F, the square style font data is loaded from the work station F so as to be developed into the bit map in the work station A.

In a case where data is displayed in the work station A by using both the fine-faced Ming dynasty style and the Gothic style, font data is loaded from the work station E if the work station E is connected to the LAN so that it is developed into the bit map in the work station A.

In order to perform the above-described operations, the structure according to this embodiment is arranged in such a manner that each of the work stations connected to the LAN has, as a table, information about font data possessed by all of the work stations and all of the printers which are connected to the LAN or which can be connected to the same. For example, a table possessed by the work station A in the structure shown in FIG. 1 is shown in FIG. 4. According to this embodiment, each of the work stations has data about itself in the similar method individually or integrally so as to make a reference.

Referring to FIG. 4, item "FM Type" shows the type of the font manager and "Device Type" shows whether or not the device is the work station (WS) or the printer (PR).

FIG. 5 is a flow chart which illustrates the sequence of processing the table shown in FIG. 4. After power has been supplied to the system, each of the work stations and printers, in step S501, initializes the retrieval table shown in FIG. 4. In next step S502, a file which stores all of address information items about the work stations and printers connected to the LAN is loaded into the memory from the FD or the like. In step S503, it is determined whether or not all of the address information items in the above-described file have been subjected to the processes in steps S504 to S507. If they have been completed, the flow proceeds to step S508. If there is address information which has not been completed, the flow proceeds to step S504. In step S504, one address information item is acquired. Then, if the forward work station or the printer can be connected (if the system has been started), the flow proceeds to step S505. If it cannot be connected, the process about the address is completed and the flow again proceeds to step S503. In step S505, information about the type of the subject device, information about the font possessed and the like are transmitted to the device having the above-described address. Then, the flow proceeds to step S506 in which information about the type of the device and information about the font possessed by the device connected. Then, they are registered in the retrieval table in step S507. Then, the flow again proceeds to step S503. In step S508, a command issued from another work station or a printer is waited for. In step S509, if the system completion command is received, the flow proceeds to step S512. If the same is not received, the flow proceeds to step S510. In step S512, data about the device which has issued the command is deleted from the retrieval table and the flow again proceeds to step S508. In a case where a command except for the command to complete the system is received in step S509, the font of the corresponding device and device information are registered to the retrieval table in step S510. Then, the flow proceeds to step S511 in which the subject device information and font information are transmitted to the corresponding device before the flow again proceeds to step S508 in which a command instruction is waited for.

In a case where there is a possibility that the font or the like possessed by the device is changed due to the interchange of the cartridge or the card, this information is updated after the power has been supplied prior to performing a communication with the other device.

Figure 6B:
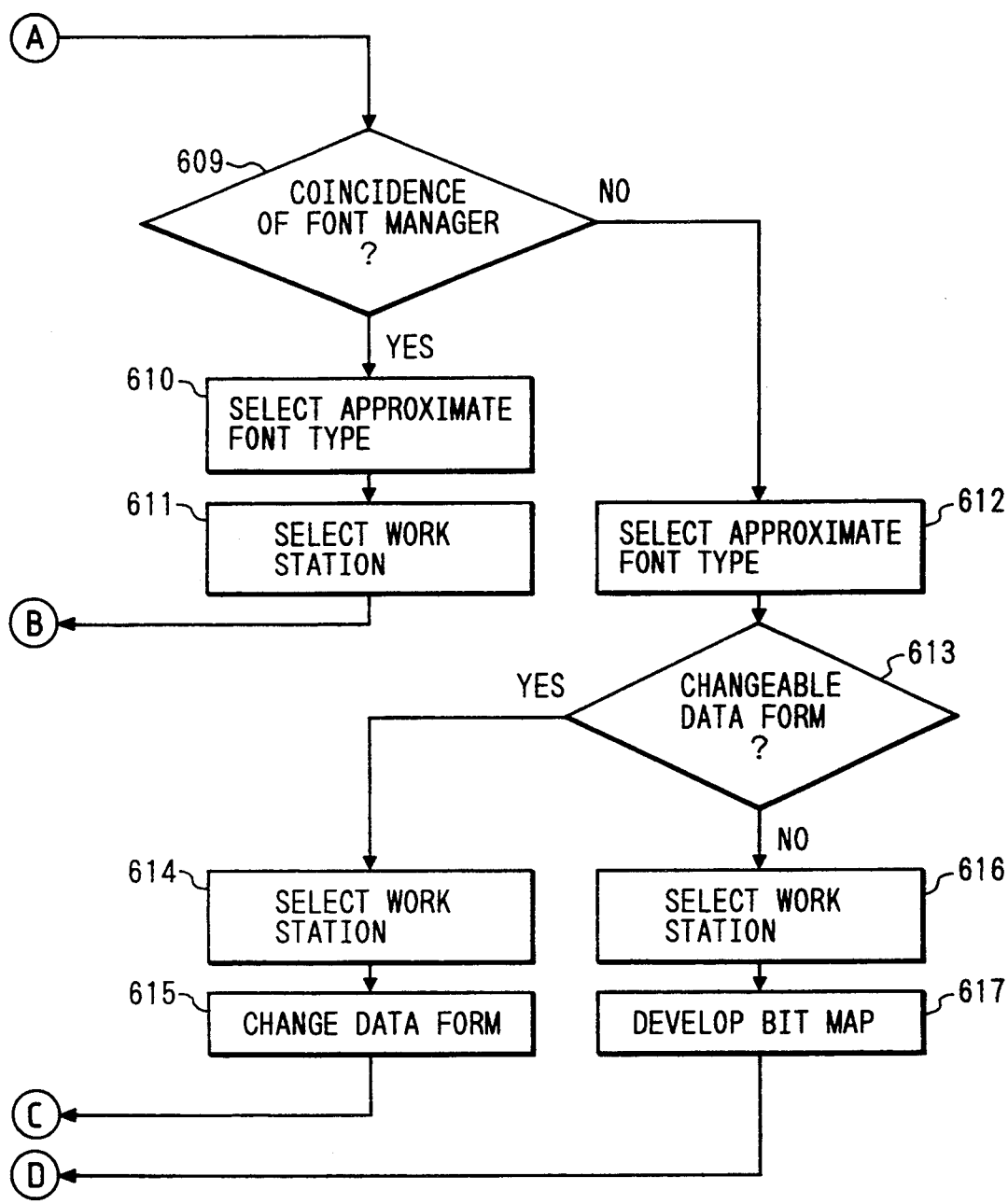

FIG. 6 is a flow chart which illustrates an example of the operation of this embodiment.

In a case where a work station having no font data requires the font data, it is first discriminated in step S610 whether or not a work station having the required type font is present by using the retrieval table shown in FIG. 4. In a case where one or more work stations having the required font data are present, the flow proceeds to step S602. If no work station has the required font data, the flow proceeds to step S609.

In step S602, it is discriminated whether or not a work station having the same font manager as that of the subject work station is present among the work stations having the required font data by using the retrieval table shown in FIG. 4. If there is, in step S602, one or more work stations having the same font manager are present, the flow proceeds to step S603. If there is no work station having the same font manager, the flow proceeds to step S604.

In step S603, one work station is selected from one or more work stations having the required font data and having the same font manager before the flow proceeds to step S619. The method of selecting the one work station may be performed in such a manner that a work station which appears first from the retrieval table shown in FIG. 4 is selected. Another method may be employed in which a work station which is performing an operation the load of which is the smallest may be selected from the pertinent work stations.

In step S602, in a case where there is no work station having the same font manager among the work stations having the same font, the flow proceeds to step S604. In step S604, it is discriminated whether or not a work station having a font data which can be converted into the data format of the font manager of the subject work station is present by using the font manager type shown in the retrieval table shown in FIG. 4 and a table shown in FIG. 11 and showing the degree of difficulty in conversion between data formats. If a discrimination is made in step S604 that there is one or more work stations having the font data the data format can be converted, the flow proceeds to step S605. If there is no work station of the type described above, the flow proceeds to step S607.

In step S605, one work station is selected from the one or more work stations detected in step S604. Then, the font data of the work station selected in step S605 is converted into the data format for the font manager possessed by the work station which requires the data before the flow proceeds to step S619.

If a discrimination is made in step S604 that there is no work station which has the font data which can be converted into the required data format of the font manager, the flow proceeds to step S607 in which one work station is selected from the one or more work stations having the same font data. In step S608, the font data is developed into the bit map on the work station selected before the flow proceeds to step S618.

If a discrimination is made in step S610 that there is no work station having the required font data, the flow proceeds to step S609 in which whether or not a work station having the same font manager is present is discriminated by using the retrieval table shown in FIG. 5. If a discrimination is made in step S609 that there is one or more work stations having the same font manager, the flow proceeds to step S610. If there is no font manager having the same font manager, the flow proceeds to step S612.

In step S610, one or more work stations having the font data which approximates the required data are selected from the work stations having the same font manager. The method of selecting the same will be described later with reference to FIGS. 13 to 15. Then, one work station is, in step S611, selected from the work stations selected in step S610.

If a discrimination is made in step S609 that there is no work station having the same font manager, one or more work stations having font data the type of which approximates to the required font data are selected in step S612. The method of selecting it will be described later with reference to FIGS. 13 to 15.

In step S613, it is discriminated whether or not a work station having a font data which can be converted into the data format of the font manager of the subject work station is present by using the font manager type shown in the retrieval table shown in FIG. 4 and a table to be described later, shown in FIG. 11 and showing the degree of difficulty in conversion between data formats. If a discrimination is made that there is one or more work stations having the font data the data format of which can be converted, the flow proceeds to step S614. If it is not present, the flow proceeds to step S616.

In step S614, one work station is selected from the one or more work stations detected in step S613. In step S615, font data of the work station selected in step S614 is converted into the required data format of the font manager before the flow proceeds to step S619.

If there is, in step S613, no work station having the font data which can be converted into the required data format of the font manager, one work station is, in step S616, selected from the one or more work stations selected in step S612. In step S617, font data is developed into the bit map on the work station selected in step S616.

Then, data which has been developed into the bit map in steps S608 and S617 is, in step S618, loaded down to the work station which has required the font.

In step S619, font data selected in step S603 or step S611 or font data the data format of which has been converted in step S615 is loaded down to the work station which has required the font development. Then, in step S620, font data which has been loaded down in step S619 is developed into the bit map on the work station which has required data. In step S621, bit map data loaded down in step S618 or data which has been developed into the bit map in step S620 is displayed. Thus, the process is completed.

The above-described operation to be performed in accordance with the flow chart shown in FIG. 6 will be specifically described by using the retrieval table shown in FIG. 4 while assuming that the work station A shown in FIG. 1 required the font.

An assumption is made here that a demand of developing fine-faced Ming dynasty style is made from the work station A (having the font manager A and no font data).

First, in step S601 shown in FIG. 6, a work station having the fine-faced Ming dynasty style font data is selected. In this state, the work stations E, F and H are selected. Since one or more work station is present, the flow proceeds to step S602.

In step S602, the work station having the same font manager as that possessed by the work station A is selected from the above-described work stations. In this state, the work stations E and F are selected. Then, in step S603, one work station is selected from the work stations selected in step S602. Assuming that the selection method is employed in which the first work station appeared in the retrieval table shown in FIG. 4 is selected, the work station E is selected here.

In step S619, the fine-faced Ming dynasty style font data of the work station E is loaded down into the work station A. Then, in step S620, font data loaded on the work station A is developed into the bit map by the font manager A and as well as data developed into the bit map in step S621 is displayed. Thus, the process is completed.

Figure 7B:
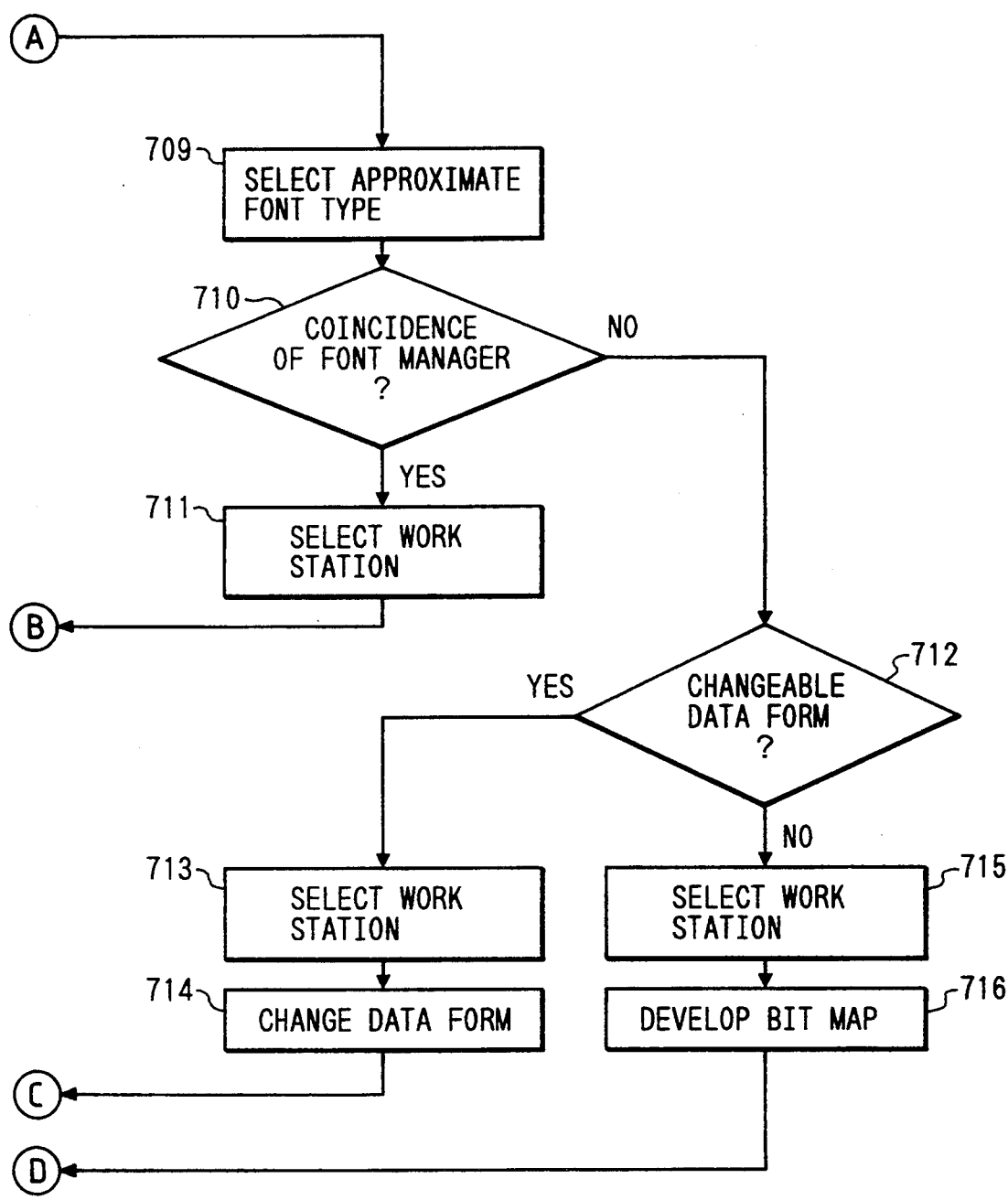

FIG. 7 is a flow chart which illustrates another example of the operation according to this embodiment. In the example shown in FIG. 6, if there is no work station having the same font, the work station having the same font manager is employed (steps S609 to S610). However, according to this example, a work station having an approximate font type is employed. This differs from that of FIG. 6.

According to this example shown in FIG. 7, in a case where a work station having no font data requires font data, it is, in step S701, determined whether or not the work station having the required font type is present by using the retrieval table shown in FIG. 4. If there are one or more work station having the required font data, the flow proceeds to step S702. If there is no work station having the required font data, the flow proceeds to step S709.

Since steps S702 to S708 (process to be performed in a case where there are one or more work stations having the required font data) are the same as steps S602 to S608, their descriptions are omitted here.

In a case where there is, in step S701, no work station having the required font data, the work station having data which approximates to the required font data is selected in step S709. The selection method in this case will be described later with reference to FIGS. 13 and 15. In step S710, it is, by using the retrieval table shown in FIG. 4, determined whether or not there is a work station having the same font manager among the work stations detected in step S709. If there is one or more work stations having the same font manager in step S710, the flow proceeds to step S711. If there is no work station having the same font manager, the flow proceeds to step S712.

And in step S711, one work station is selected from the work stations selected in step S710 before the flow proceeds to step S718.

Figures 11, 12:
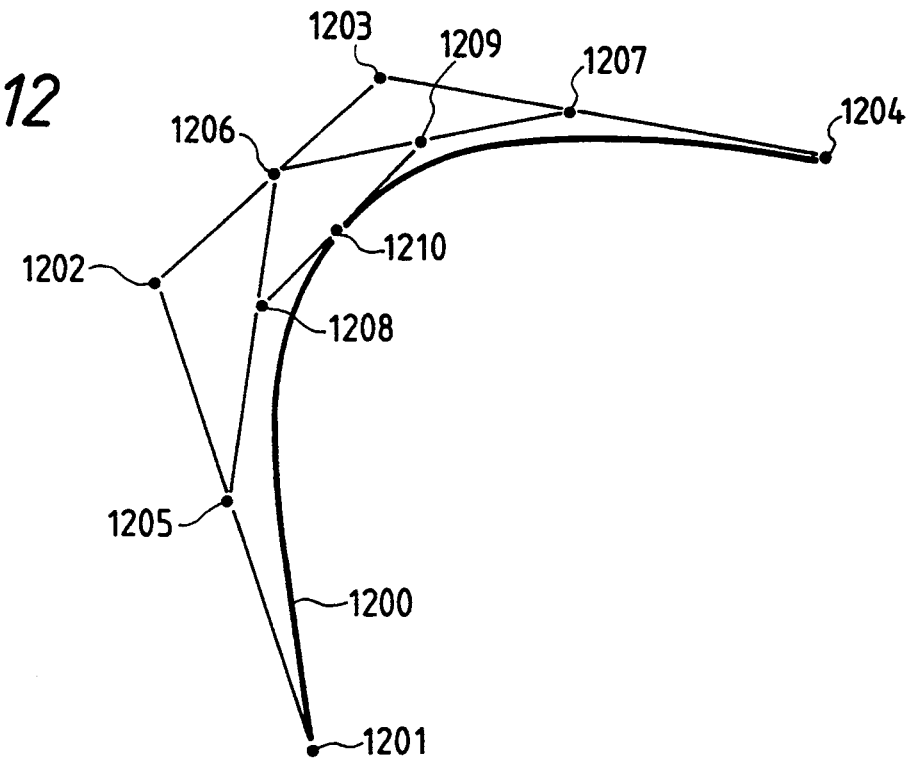
FIG. 11 illustrates converting between fonts.
FIG. 12 illustrates a method of converting a Bézier curve into a straight line.

In step S712, it is, by using the font manager type shown in the retrieval table shown in FIG. 4 and the table shown in FIG. 11, determined whether or not there is a work station having font data which can be converted into the data format of the font manager possessed by the work station which requires font because no work station having the same font manager is present. If a discrimination is, in step S712, made that there is one or more work stations having font data the data format of which can be converted, the flow proceeds to step S713. If it is not present, the flow proceeds to step S715.

In step S713, one work station is selected from the one or more work stations detected in step S712. In next step S714, font data of the work station selected in step S713 is converted into the data format of the required font manager before the flow proceeds to step S718.

In step S715, one work station is selected from the one or more work stations selected in step S709. In step S716, font data is developed into the bit map on the work station selected in step S715 before the flow proceeds to step S717.

Since steps S717 to S720 (the process to be performed in a case where data developed into the bit map is loaded down or data which has been loaded down is developed into the bit map so as to be displayed) are the same as steps S618 to S621, their descriptions are omitted here.

Then, another embodiment of the present invention will now be described with reference to a flow chart shown in FIG. 8.

According to this embodiment, when a font is obtained from another work station, a work station having the same font manager is employed.

In step S801, in a case where a certain work station requires a font, first a discrimination is, by using the retrieval table shown in FIG. 4, made whether or not there is a work station having the same font manager possessed by the work station which requires the font. If one or more work stations are present, the flow proceeds to step S802. If there is no work station having the same, the flow proceeds to step S805.

In step S820, it is, by using the retrieval table shown in FIG. 4, determined whether or not there is a work station having the required font data among the work stations having the required font manager and detected in step S801. If one or more work stations having the required font data is present, the flow proceeds to step S803. If it is not present, the flow proceeds to step S804.

Step S803 is a step the operation of which is performed in a case where one or more work stations having the same font manager and font data are present. In step S803, one work station is selected from the one or more work stations. The method of selecting the one work station from a plurality of the work stations may be a method in which a work station which appears first in the retrieval table shown in FIG. 4 is selected. Another method may be employed in which a work station which is performing an operation under the lightest load is selected. After the process in step S803 has been completed, the flow proceeds to step S815.

Step S804 is a step the operation of which is performed in a case where there is a work station having the same manager and as well as there is no work station having the required font data. A work station having font data which approximates required font data is selected from the work stations having the same font manager before the flow proceeds to step S815. The selection method in this case will be described later with reference to FIGS. 13 to 15.

Step S805 is a step the operation of which is performed in a case where a discrimination is made in step S801 that there is the work station having the same font manager. In step S805, a discrimination is made by using the retrieval table shown in FIG. 11 whether or not there is a work station having font data the format of which can be converted into the data format of the required font manager. In a case where there are one or more work stations having font data the format of which can be converted into the data format of the required font manager, the flow proceeds to step S806. If the work station of this type is not present, the flow proceeds to step S810.

Step S806 is a step the process of which is performed in a case where no work station having the same manager is present and also where there is one or more work stations having font data the format of which can be converted into the format of the required font manager. In step S806, a discrimination is made whether or not a work station having required font data is present among the above-described work stations. In a case where one or more work stations having required font data are present, the flow proceeds to step S807. If the work station having required font data is not present, the flow proceeds to step S808.

In step S807, one work station is selected from the one or more work stations detected in step S806. The method of selecting the one work station from a plurality of the work stations may be a method in which a work station which appears first in the retrieval table shown in FIG. 4 is selected. Another method may be employed in which a work station which is performing an operation under the lightest load at this time is selected.

Step S808 is a step the operation of which is performed in a case where the work station having the same font manager is not present, no work station having required font data is present and there is one or more work stations having font data the format of which can be converted into the data format of the font manager possessed by the work station which is requiring font. In step S808, a work station having font data which approximates to the above-described font data is selected. The selection method in this case will be described later with reference to FIGS. 13 to 15.

In step S809, font data of the work station selected in step S807 or step S808 is converted into the data format of the required font manager. Step S810 is a step the process of which is performed in a case where no work station having the same font manager is present and no work station having font data which can be converted into the data format of the font manager is present. In step S810, a discrimination is, by using the retrieval table shown in FIG. 5, made whether or not there is a work station having required font data. In a case where one or more work stations having required font data are present, the flow proceeds to step S811. If it is not present, the flow proceeds to step S812.

In step S811, one work station is selected from a plurality of the work stations having required font data. The method of selecting the one work station from a plurality of the work stations may be a method in which a work station which appears first in the retrieval table shown in FIG. 4 is selected. Another method may be employed in which a work station which is performing an operation under the lightest load is selected.

Step S812 is a step the operation of which is performed in a case where there is no work station having the same font manager, no work station having required font data is present and the conversion of the data format into that of the font manager of the work station which requires font cannot be performed. In step S812, one work station having font data the type of which approximates to required font data is selected from a plurality of work stations. The method of selecting it will be described later with reference to FIGS. 13 to 15.

In step S813, font data is developed into the bit map on the work station selected in step S811 or step S812. Then, in step S814, font data which has been developed into the bit map in step S813 is loaded down to the subject work station which requires font.

On the other hand, in step S815, font data selected in step S803 or step S804 or data the format of which has been converted in step S809 is loaded down to the subject work station which requires data font. In next step S816, font data loaded down in step S815 is developed into the bit map by the required font manager.

In step S817, bit map data loaded down in step S814 or data developed into the bit map in step S816 is displayed. Thus, the process is completed.

Figure 8B:
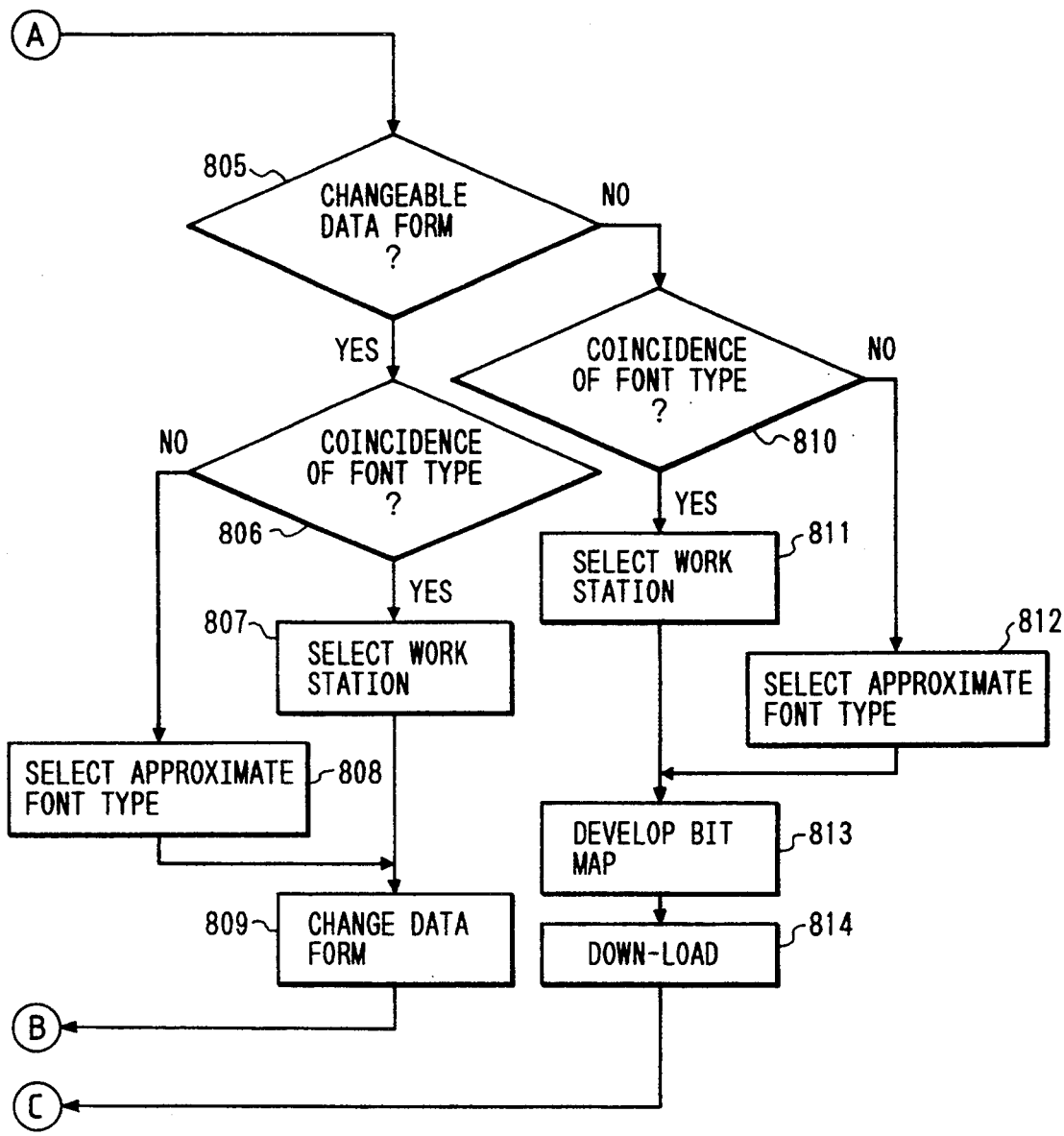

Then, the operation according to the above-described flow chart shown in FIG. 8 will now be more specifically described by using the retrieval table shown in FIG. 4 while making an assumption that the work station A of the structure shown in FIG. 1 requires the font.

A case is considered here that a demand of developing the bold-faced Ming dynasty style is made from the work station A (having the font manager A but no font data).

First, a work station having the same font manager as that of the work station A is selected in step S801 shown in FIG. 8. In this state, the work stations E, F and G are selected. Since one or more work station is selected, the flow proceeds to step S802. In step S802, a discrimination is made whether or not there is the work station having font data required by the work station A among the above-described work stations. In this case, the work station G is selected. In step S803, one work station is selected from the work stations selected in step S802. However, since only the work station G is selected here, the work station G is determined to be the selected work station.

In step S815, font data of the work station G is loaded down to the work station A. In next step S816, font data loaded down to the work station A is developed into the bit map by the font manager A before data, which has been developed into the bit map, is displayed in step S817. Thus, the subject process is completed.

Then, another embodiment of the present invention will now be described with reference to a flow chart shown in FIG. 9.

Although the structure shown in FIG. 8 is arranged in such a manner that, in a case where the work station having the same font manager is not present, the work station having font data, which can be converted into the data format which can be used by the font manager of the work station which requires font, is selected (in steps S801 and S805), a work station having the font of the same type is selected according to this embodiment.

Figure 9B:
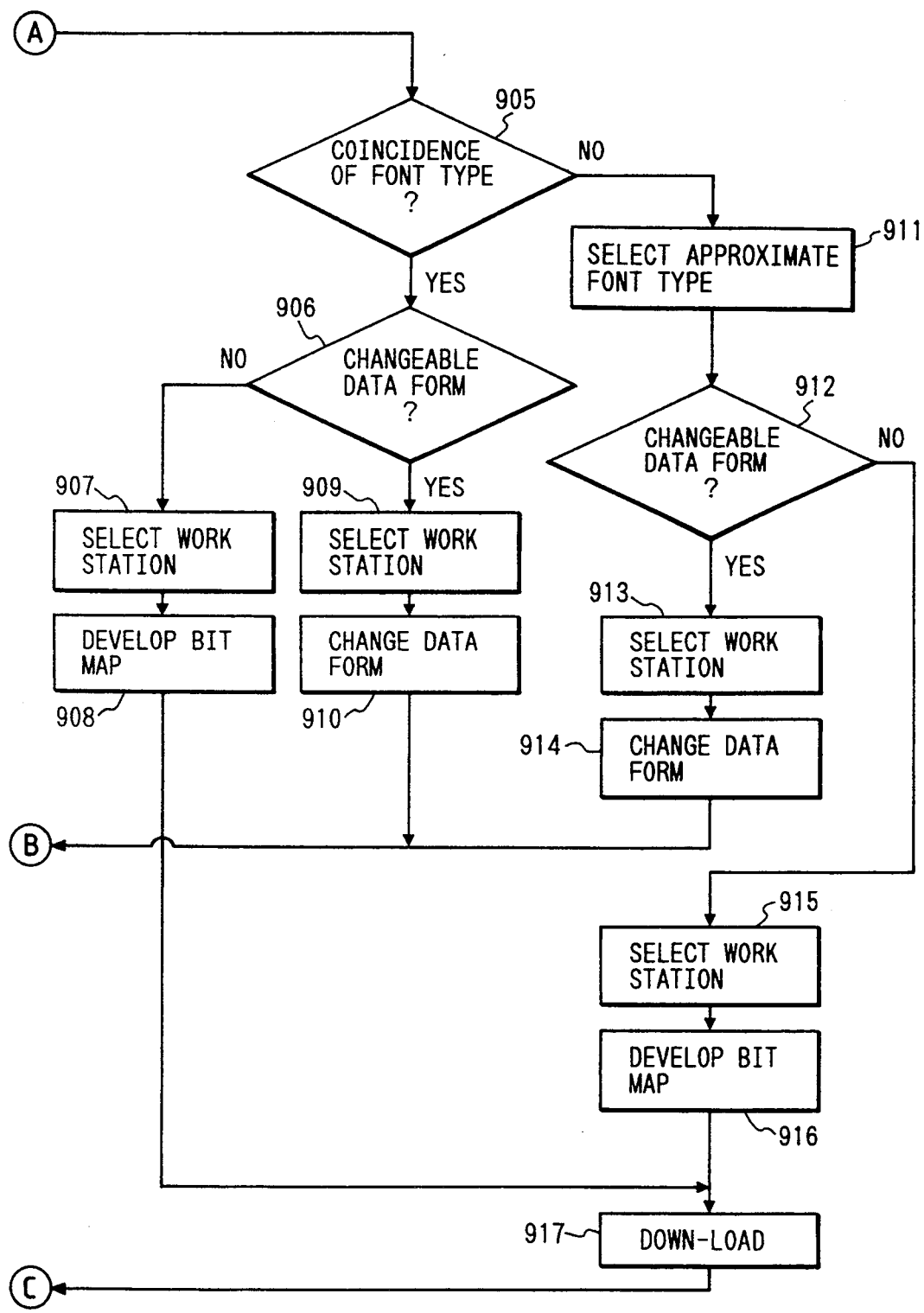

In step S901 shown in FIG. 9, a discrimination is, by using the retrieval table shown in FIG. 4, made whether or not there is a work station having the same font manager as that of the work station which requires font. If one or more work stations have the same font manager, the flow proceeds to step S902. If there is no same font manager, the flow proceeds to step S905.

Since steps S902 to S904 (the operations to be performed in the case where one or more work stations having the font manager are present) are the same as steps S802 to S804, their descriptions are omitted here.

Step S905 is a step the operation of which is performed in a case where a discrimination is made in step S901 that there is no work station having the same font manager. In step S905, whether or not the work station having required font data is present is discriminated by using the retrieval table shown in FIG. 4. If there is one or more work stations having required font data, the flow proceeds to step S906. If there is no work station having required font data, the flow proceeds to step S911.

In step S906, whether or not there is font data which is possessed by the work station selected in step S905 and which can be converted into the data format of the font manager of the work station which requires font data is discriminated by using the retrieval table shown in FIG. 11. If there is one or more font data the format of which can be converted, the flow proceeds to step S907. If there is no font data of this type, the flow proceeds to step S909.

In step S907, one work station is selected from a plurality of the work stations having font data the format of which can be converted and selected in step S906. The method of selecting the one work station from a plurality of the work stations may be a method in which a work station which appears first in the retrieval table shown in FIG. 4 is selected. Another method may be employed in which a work station which is performing an operation under the lightest load is selected. Then, in step S908, the format of font data selected in step S907 is converted into that of the required font manager.

On the other hand, since it has been found in step S906 that the format of same format cannot be converted into the data format of the required font manager, one work station is, in step S909, selected from a plurality of the work stations having font data and selected in step S905. The method of selecting the one work station from a plurality of the work stations may be a method in which a work station which appears first in the retrieval table shown in FIG. 4 is selected. Another method may be employed in which a work station which is performing an operation under the lightest load is selected. Then, in step S910, required font data is developed into the bit map on the work station selected in step S909.

Step S911 is a step the operation of which is performed in a case where there is no same font manager and as well as there is no work station having required font data. In step S911, one or more alternative font data is selected. The selection method in this case will be described later with reference to FIGS. 13 to 15.

In step S912, a discrimination is made whether or not there is font data the format of which can be converted into that of the required font manager among one or more font data items selected in step S911. If there is one or more font data items which can be converted as described above, the flow proceeds to step S913. If no font data of this type is present, the flow proceeds to step S915.

In step S913, one work station is selected from a plurality of the work stations having font data the format of which can be converted and selected in step S912. The method of selecting the one work station from a plurality of the work stations may be a method in which a work station which appears first in the retrieval table shown in FIG. 4 is selected. Another method may be employed in which a work station which is performing an operation under the lightest load is selected. In step S914, the format of selected font data is converted into that of the required font manager.

On the other hand, step S915 is a step the operation of which is performed in a case where a discrimination is made in step S912 in which there is no data which can be converted as described above. In step S915, one work station is selected from a plurality of the work stations having font data and selected in step S911. The method of selecting the one work station from a plurality of the work stations may be a method in which a work station which appears first in the retrieval table shown in FIG. 4 is selected. Another method may be employed in which a work station which is performing an operation under the lightest load is selected. Then, in step S916, font data is developed into the bit map on the work station selected in step S915.

In step S917, data, which has been developed into the bit map in step S910 or step S916 is downloaded to the work station which requires font. In step S918, font data selected in step S903 or step S904 or data, the format of which has been converted in step S908 or step S914 is loaded down to the work station which requires the font. In step S919, font data, which has been downloaded in step S918, is developed into the bit map by the required font manager.

In step S920, bit map data which has been downloaded in step S917 or data, which has been developed into the bit map data in step S918, is displayed. Thus, the subject process is completed.

Then, the operation to be performed in accordance with the flow chart shown in FIG. 9 will further specifically be described while making an assumption that the work station D of the structure shown in FIG. 1 requires font.

In a case where the work station D requires the fine-faced Ming dynasty style font to be developed, a work station having the same font manager as that of the work station D is first selected in step S901 shown in FIG. 9. Since there is no work station having the same font manager as that of the work station D, the flow proceeds to step S905 here.

In step S905, a discrimination is made whether or not there is a work station having the fine-faced Ming dynasty style font data required by the work station D so that the pertinent work station is selected. In this case, the work stations E, F and H are selected. Since one or more same font data are present, the flow proceeds to step S906.

In step S906, it is discriminated by using FIG. 11 whether or not there is font data the format of which can be converted into that of the font manager possessed by the work station D. Since only the font manager B can be converted into the font manager D here, the work station H is selected. Since the work station having font data which can be converted as described above is present, the flow proceeds to step S907 here.

In step S907, one work station is selected from the work stations selected in step S906. Since only the work station H is selected in step S906, this work station H is selected. In step S908, fine-faced Ming dynasty style data font of the data format of the font manager B possessed by the work station H is converted into the data format of the font manager D.

In step S918, converted data is downloaded to the work station D before downloaded data is developed into the bit map by the font manager D on the work station D in step S919. Finally, data, which has been developed into the bit map, is displayed in step S920. Thus, the subject process is completed. Each of the embodiments described with reference to the flow charts shown in FIGS. 6 to 9 are arranged to display data. However, an operation can similarly be performed in which a certain work station performs printing by a printer subordinated thereto by using font data loaded down thereto from a printer subordinating to the other work station.

Then, an embodiment will now be described with reference to a flow chart shown in FIG. 10 in which one printer having optimum font data is selected from a plurality of printers so as to perform printing by the selected printer.

Figure 10B:
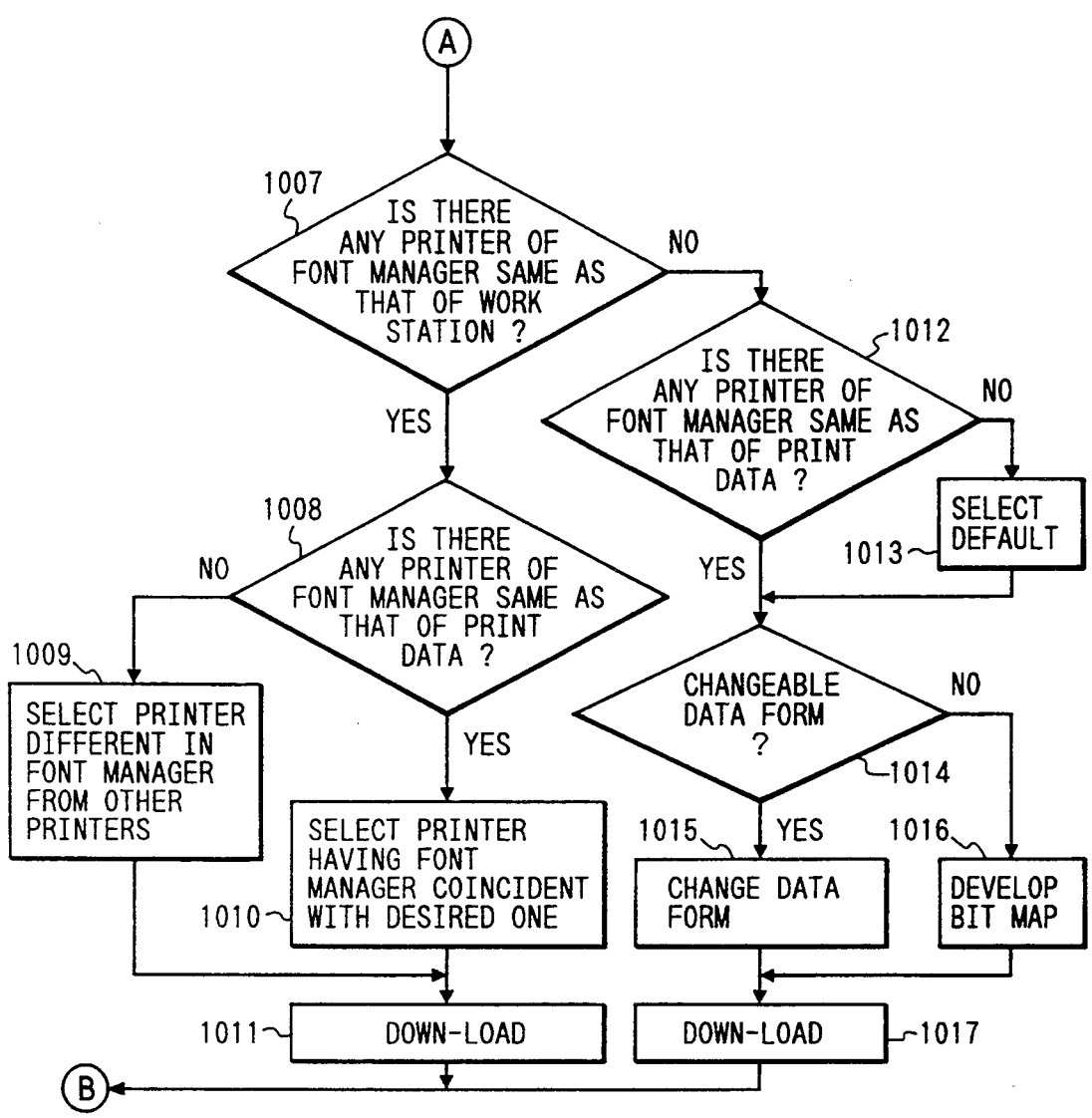

In step S1001 shown in FIG. 10, it is discriminated by using the retrieval table shown in FIG. 4 whether or not there is a printer having the required font data. If there is one or more printers having the same font data, all of the printers having the same font data are made to be the subject of the selection before the process proceeds to step S1002. If there is no printer of this type, the flow proceeds to step S1005.

In step S1002, a discrimination is made by using the retrieval table shown in FIG. 4 whether or not there is a printer having the required font manager among the printers having the same font data in step S1001. If one or more printers having the same font manager are present, the printers having the same font manager are made to be the subject of the selection before the flow proceeds to step S1004. If there is no printer which has the same font manager, the flow proceeds to step S1003.

Step S1003 is a step the operation of which is performed in a case where there is one or more printers having the font which is made to be the subject of the selection in the steps to step S1002 and as well as there is no required font manager possessed by the printer. In this state, for example, a printer first appeared in the retrieval table shown in FIG. 4 is selected before the flow proceeds to step S1018.

Step S1004 is a step the operation of which is performed in a case where there is one or more printers having the font and the font manager which are the subject of the selection. In a case where there are a plurality of printers are selected, the printer first appeared in the retrieval table shown in FIG. 4 is selected before the flow proceeds to step S1018.

In step S1005, it is discriminated by using the retrieval table shown in FIG. 4 whether or not required font data is present in the other work stations. If it is present, one of them is selected before the flow proceeds to step S1007. If it is not present, the flow proceeds to step S1006.

In step S1006, a work station having font data which approximates to required font data is selected by using the retrieval table shown in FIG. 4. The method of selecting the approximate font data will be described later.

In step S1007, a discrimination is made whether or not there is a printer having the same font manager as that of the work station selected in step S1005 or step S1006. If there are one or more printers of this type, the flow proceeds to step S1008. If the printer of this type is not present, the flow proceeds to step S1012.

In step S1008, it is discriminated whether or not there is a pair having the same font manager as data to be printed among pairs composed of the work stations having the required font which are selected in steps S1005 and S1007 and the printers having the same font manager as that of these work stations. If there is one or more pairs, the work stations and the printers having the above-described font manager are made to be the subject of the selection before the flow proceeds to step S1010. If the pair of this type is not present, the flow proceeds to step S1009.

In step S1009, one of a work station and a printer are selected from the work stations and printers which are the subject of the selection. The method of selecting the one work station from a plurality of the work stations may be a method in which a work station which appears first in the retrieval table shown in FIG. 4 is selected. Another method may be employed in which a work station which is performing an operation under the lightest load is selected. Then, the flow proceeds to step S1011.

In step S1010, one of a work station and a printer are selected from the work stations and printers which are the subject of the selection. The method of selecting the one work station from a plurality of the work stations may be a method in which a work station which appears first in the retrieval table shown in FIG. 4 is selected. Another method may be employed in which a work station which is performing an operation under the lightest load is selected. Then, the flow proceeds to step S1011.

In step S1011, font data present in the selected work station or the printer is, via the LAN circuit, downloaded to the printer which performs the printing operation.

In step S1012, a discrimination is made by using the retrieval table shown in FIG. 4 whether or not there is the printer having the required font manager. If there is one or more printers, the flow proceeds to step S1014 while making the printer having the above-described font manager to be the subject of the retrieval. If there is no printer of this type, the flow proceeds to step S1013.

In step S1013, a printer registered on the table is selected as an operation to be performed in a default case. If the above-described printer cannot be selected, a printer having the same manager as that of the above-described printer is selected before the flow proceeds to step S1014.

In step S1014, if the format of font data of the work station shown in the retrieval table can be converted into that of the font manager of the required printer, the flow proceeds to step S1015. If the same cannot be converted as described above, the flow proceeds to step S1016.

In step S1015, font data on the selected work station is converted into the format of font data of font manager of the above-described printer.

In step S1016, font data is converted into the bit map on the work station selected.

In step S1017, font data converted in step S1015 or data, which has been developed into the bit map in step S1016, is loaded down to the printer.

In step S1018, data is printed by using font data included in the printer, font data loaded down and the bit map which has been loaded down. Thus, the subject process is completed.

According to each of the above-described embodiments, one printer is selected from the printers present on the network. However, in a case where a printer, which can be substantially used by each work station, is fixed due to a limitation of their installation positions even if there are a plurality of printers on the network, a desire of using a font, which is not possessed by the above-described printer, is met in the similar method to that in which display is performed by using the font which is not possessed by the work station. That is, another device is selected in accordance with the data format of the font manager of the above-described printer so as to load down font data from the selected device to the above-described printer.

FIG. 11 is a table showing the degree of easiness at the time of converting the font data format.

Referring to FIG. 11, item "Third Bézier" shows font data expressed by a third order Bézier curve+a straight line "Straight" shows font data expressed by only a straight line, "Third B-spline" shows font data expressed by a third order B-spline curve+a straight line, "Second Bézier" shows font data expressed by a second order Bézier+a straight line and "Circular arc" shows font data expressed by a circular arc+a straight line. Symbols A to E respectively denote the types of the font managers corresponding to the data formats.

FIG. 11 illustrates the degree of easiness in a conversion from the items in the row direction into the items in the column direction, where ⊙ denotes a degree of easiness of a level at which a conversion can be performed while maintaining the original accuracy, ○ denotes a degree of easiness of a level at which a conversion can be performed while approximating to data and x denotes a degree of easiness of a level at which the conversion cannot be performed or a level at which the conversion cannot be performed easily because the load is too large.

Then, a method of converting a certain font into another font will now be described. FIG. 12 illustrates an example of a conversion in which the Bézier curve is converted into a straight line.

Referring to FIG. 12, reference numeral 1200 represents a Bézier curve to be displayed, 1201 represents an end point which is the commencement point of the curve, 1202 and 1203 represent middle points and 1204 represents a terminal point which is the end point of the curve.

The Bézier curve 1200 can be expressed by the following equation by using the end point 1201, the middle points 1202 and 1203 and the end point 1204:

Assuming that
end point 1201 $(X_0, Y_0)$
middle point 1202 $(X_1, Y_1)$
middle point 1203 $(X_2, Y_2)$
end point 1204 $(X_3, Y_3)$
the Bézier curve 1200 can be expressed by:

$$X(t) = X_0 t^3 + X_1 t^2 (1-t) + X_2 t (1-t)^2 + X_3 (1-t)^3$$

$$Y(t) = Y_0 t^3 + Y_1 t^2 (1-t) + Y_2 t (1-t)^2 + Y_3 (1-t)^3$$

$$t = 0 \rightarrow 1$$

Then, the Bézier curve expressed by the above-described equation is converted into a straight line.

Referring to FIG. 12, reference numeral 1205 represents a midpoint between the end point 1201 and the middle point 1202. Reference numeral 1206 represents a midpoint between the middle point 1202 and the middle point 1203. Reference numeral 1207 represents a midpoint between the middle point 1203 and the end point 1204. Reference numeral 1208 represents a midpoint between 1205 and 1206. Reference numeral 1209 represents a midpoint between 1206 and 1207. Reference numeral 1210 represents a midpoint between 1208 and 1209. In a case where the Bézier curve is approximated to a straight line, an approximation straight line can be drawn by writing a straight line connecting the points 1201, 1205, 1208, 1209, 1207 and 1204. The point 1210 is positioned on a segment connecting the points 1208 and 1209. A further fine approximation can be performed by respectively approximating a Bézier curve connecting the points 1201, 1205, 1208 and 1210 and another Bézier curve connecting the points 1210, 1209, 1207 and 1204 to straight lines. As described above, the Bézier curve can be recursively expressed and as well as the same can be approximated to a straight line.

By using the above-described conversion equation, font data expressed by a straight line and a Bézier curve can be converted into font data expressed by only a straight line.

Then, a method of selecting a font will now be described with reference to a flow chart shown in FIG. 13.

Figure 13:
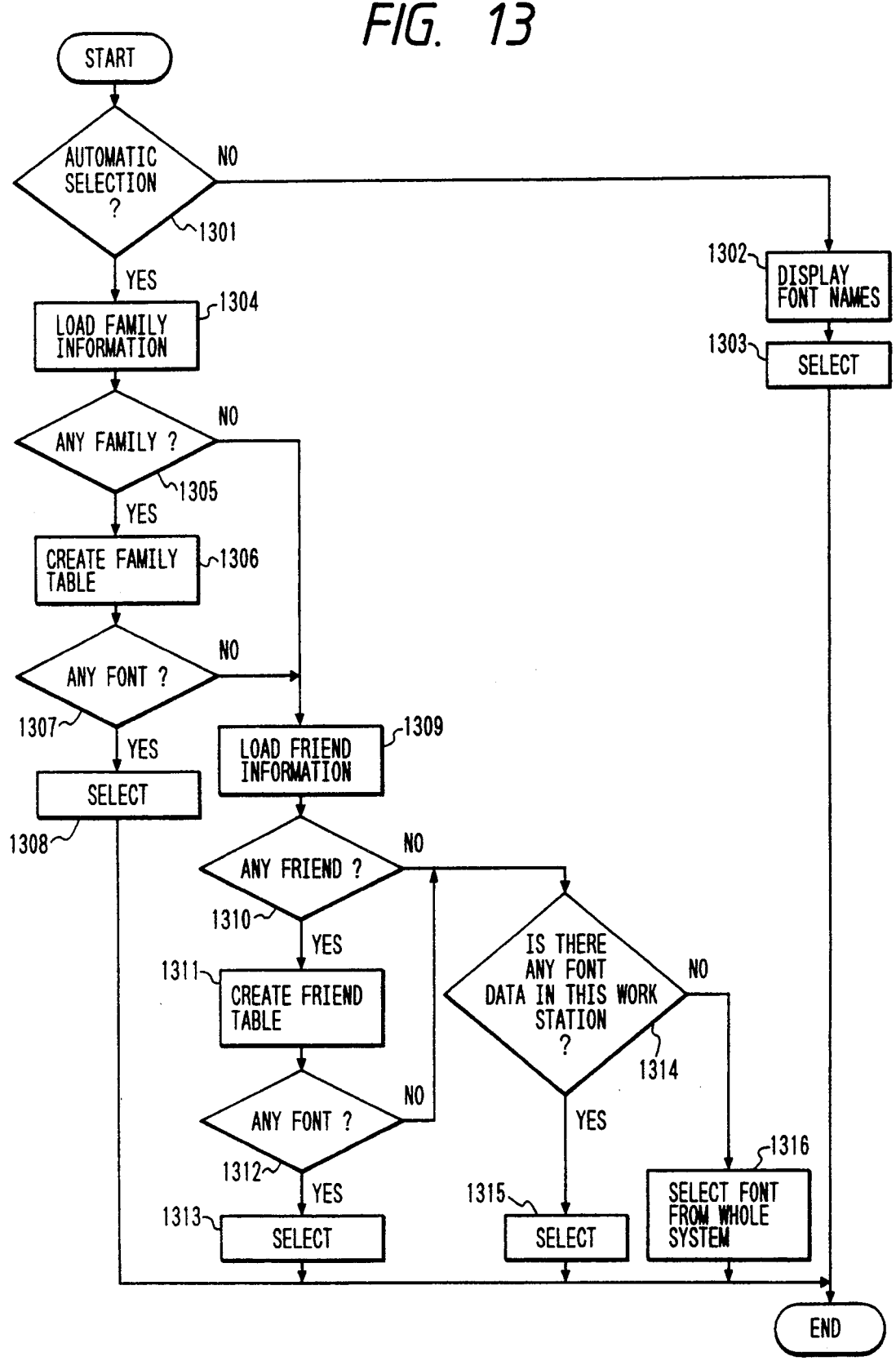
FIG. 13 is a flow chart which illustrates an operation of selecting a font.

In step S1301 shown in FIG. 13, a selection is made that a font is selected automatically or in accordance with an instruction issued from an operator (manual selection). In a case where the manual font selection is selected, the flow proceeds to step S1302. In the other case, the flow proceeds to step S1304.

In step S1302, all of font names shown in the retrieval table shown in FIG. 4 are displayed so that an operator, in step S1303, selects a font from the fonts displayed. Thus, the subject process is completed.

On the other hand, in step S1304, the file in which family information is registered is loaded into the memory. In step S1305, a reference is made to family information loaded. If the family is present in the required font, the flow proceeds to step S1306. If the same is not present, the flow proceeds to step S1309.

In step S1306, a family retrieval table as shown in FIG. 14 is processed from the retrieval table shown in FIG. 4 and family information.

In step S1307, if a device having a subject font is present in the family retrieval table, the flow proceeds to step S1308. If no device is present, the flow proceeds to step S1309.

In step S1308, the font of the approximate weight is selected by using the family retrieval table shown in FIG. 14. The weight may be heavier than the subject font or lighter than the same.

In step S1309, a file to which friend information is registered is loaded. Then, in step S1310, a reference is made to loaded friend information. If a friend is present in the required font, the flow proceeds to step S1311. If the same is not present, the flow proceeds to step S1314.

In step S1311, a friend retrieval table shown in FIG. 15 is created by using a retrieval table shown in FIG. 4 and the loaded friend information. In step S1311, if one or more fonts are present in the friend retrieval table, the flow proceeds to step S1312. If it is not present, the flow proceeds to step S1314.

In step S1312, a font is selected by using a friend retrieval table shown in FIG. 15. The method of selecting the font may be a method in which the font of a work station which appears first in the friend retrieval table shown in FIG. 15 is selected. Another method may be employed in which the font of a work station which is performing an operation under the lightest load is selected.

In step S1314, it is discriminated by using the retrieval table shown in FIG. 4 whether or not font data is present in the own work station. If one or more fonts are present in own work station, the flow proceeds to step S1315. If it is not present, the flow proceeds to step 1316.

In step S1315, a font is selected by using the retrieval table shown in FIG. 4. The method of selecting the font may be a method in which the font of the subject work station which appears first in the retrieval table shown in FIG. 4 is selected or that appears finally is selected.

In step S1316, the font is selected from the overall system by using the retrieval table shown in FIG. 4. The method of selecting the font may be a method in which the font which appears first in the retrieval table shown in FIG. 4 is selected. Another method may be employed in which the font of a work station which is performing an operation under the lightest load is selected.

Thus, the font selection operation is completed.

As described above, according to the present invention, if a required font is not possessed by the subject device at the time of transmitting information, an optimum font is automatically selected from fonts possessed by the other devices in the network so as to be loaded and selectively transmitted.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An information outputting method for a first information processing device connected to at least one second information processing device, wherein each of the first and second information processing devices can output information visually, said information outputting method comprising the steps of:

specifying a type of font information for outputting information;

discriminating, when font information of the specified type is not stored in the first information processing device, whether font information of the specified type is stored in any of the at least one second information processing device;

selecting, when a discrimination is made as a result of said discriminating step that at least one second information processing device stores font information of the specified type, one information processing device from the at least one second information processing device discriminated to be storing the font information of the specified type;

loading font information of the specified type from the selected information processing device to the first information processing device; and outputting information in accordance with the loaded font information.

2. An information outputting method according to claim 1, further comprising a step of developing font information of the specified type into a bit map in the selected information processing device, wherein developed font information is loaded in said loading step.

3. An information outputting method according to claim 1, wherein the first information processing device stores the type of font information stored in the at least one second information processing device and said discriminating step is performed on the basis of the type of font information.

4. An information printing method for a first information processing device connected to a plurality of second information processing devices including one or more printing devices, wherein each of the first and second information processing devices can output information visually, said information printing method comprising the steps of:

specifying a type of font information for printing information by a printing device;

discriminating, when font information of the specified type is not stored in one of the one or more printing devices and the first information processing device, whether the same is stored in any of the plurality of second information processing devices;

selecting, when the discriminating step discriminates at least one of the plurality of the second information processing devices in which font information of the specified type is stored, one of the plurality of second information processing devices from the discriminated second information processing devices;

loading font information of the specified type from the selected information processing device to the first information processing device; and printing information in accordance with loaded font information.

5. An information printing method according to claim 4, further comprising a step of developing font information of the specified type into a bit map in the selected information processing device, wherein developed font information is loaded in said loading step.

6. An information printing method according to claim 4, wherein the first information processing device stores the type of font information stored in the plurality of second information processing devices and said discriminating step is performed on the basis of the type of font information.

7. An information printing method for an information processing device connected to a plurality of printing devices, wherein the information processing device and the plurality of printing devices can output information visually, said information printing method comprising the steps of:

specifying a type of font for printing information;

discriminating whether font information about the specified type of font is stored in each of the plurality of printing devices;

selecting, when a discrimination is made that font information about the specified type of font is stored in at least one of the printing devices, one printing device from the plurality of printing devices; and outputting a print from the selected printing device.

8. An information printing method according to claim 7, wherein the information processing device stores the type of font information stored in each of the plurality of printing devices connected and said discriminating step is performed on the basis of the type of font information.

9. An information outputting method for a first information processing device connected to a plurality of second information processing devices, wherein each of said first and second information processing devices can output information visually, said information outputting method comprising the steps of:

specifying a type of font information for outputting information;

discriminating, when font information of the specified type is not stored in the first information processing device, whether font information of the specified type is stored in any of the plurality of second information processing devices;

selecting, when a discrimination is made as a result of said discriminating step that none of the plurality of second information processing devices in which font information of the specified type is stored, one of the plurality of second information processing devices which store optimum font information which can be used in place of font information of the specified type;

loading optimum font information from the selected information processing device to the first information processing device; and outputting information in accordance with loaded font information.

10. An information outputting method according to claim 9, wherein the first information processing device stores the type of font information stored in the plurality of second information processing devices connected and said discriminating step is performed on the basis of the type of font information.

11. An information outputting method according to claim 9, wherein the first information processing device stores information about the degree of replacement suitability between font information items and said selecting step is performed on the basis of the type of font information.

12. An information printing method for a first information processing device connected to a plurality of second information processing devices including one or more printing devices, wherein each of the first and second information processing devices can output information visually, said information printing method comprising the steps of:

specifying a type of font information for outputting information in the form of a print;

discriminating, when font information of the specified type is not stored in the first information processing device and any of the one or more printing devices which output information, whether font information of the specified type is stored in any of the second information processing devices other than the one or more printing devices connected;

selecting, when a discrimination is made as a result of said discriminating step that there is no information processing device in which font information of the specified type is stored, one of said plurality of second information processing devices which stores optimum font information which can be used in place of font information of the specified type;

loading optimum font information from the selected information processing device to one of the one or more printing devices which outputs information; and printing information in accordance with loaded font information.

13. An information printing method according to claim 12, wherein the first information processing device stores the type of font information stored in the plurality of second information processing devices connected and said discriminating step is performed on the basis of the type of font information.

14. An information printing method according to claim 12, wherein the first information processing device stores information about the degree of replacement suitability between font information items and said selecting step is performed on the basis of stored information.

15. An information printing method for an information processing device connected to a plurality of printing devices, wherein each of the information processing device and the plurality of printing devices can output information visually, said information printing method comprising the steps of:

specifying a type of a font information for outputting information;

discriminating whether font information of the specified type is stored in each of the plurality of printing devices;

selecting, when a discrimination is made as a result of said discriminating step that there is no printing device in which font information of the specified type is stored, one of the plurality of printing devices which stores optimum font information which can be used in place of font information of the specified type; and outputting a print by the selected printing device.

16. An information printing method according to claim 15, wherein the information processing device stores the type of font information stored in each of the plurality of printing devices connected and said discriminating step is performed on the basis of the type of font information.

17. An information printing method according to claim 15, wherein the information processing device stores information about the degree of replacement suitability between font information items and said selecting step is performed in accordance with the stored information.

18. An information outputting method for a first information processing device connected to a plurality of second information processing devices and capable of creating characters of a font by developing font information, wherein each of the first and the plurality of second information processing devices can output information visually, said information outputting method comprising the steps of:

specifying a type of font for outputting information;

discriminating, when font information about the specified type of font is not stored in the first information processing device, whether font information about the specified type of font is stored in any of the plurality of second information processing devices connected;

determining whether the development format of each of the plurality of second information processing devices, which has been discriminated as storing font information of the specified type therein, coincides with the development format of the first information processing device;

selecting one of the plurality of second information processing devices from the plurality of second information processing devices which have been discriminated as having development formats coinciding with that of the first information processing device; and loading font information of the specified type from the selected information processing device to the first information processing device.

19. An information outputting method according to claim 18, wherein the first information processing device stores the type of font information stored in each of the plurality of second information processing devices connected and said font development format, and said discriminating and determining steps are performed on the basis of said type of font information.

20. An information printing method for a first information processing device connected to a plurality of second information processing devices including one or more printing devices, wherein each of the first and second information processing devices can output information visually, said information printing method comprising the steps of:

specifying a type of font information for outputting information in the form of a print by one of the one or more printing devices;

discriminating, when font information of the specified type is not stored in the first information processing device and in any of the one or more printing devices which output the information, whether font information of the specified type is stored in any other of the plurality of second information processing devices connected;

identifying whether the development format of each of the discriminated second information processing devices, coincides with the development format of the printing device;

selecting one information processing device from the plurality of second information processing devices identified in the identifying step;

loading font information of the specified type from the selected information processing device to the printing device; and printing information in accordance with loaded font information.

21. An information printing method according to claim 20, wherein the first information device stores the type of font information stored in each of the plurality of second information processing devices connected and said discriminating and identifying steps are performed on the basis of the contents stored.

22. An information printing method for a first information processing device connected to a plurality of second information processing devices including one or more printing devices, wherein each of the first and second information processing devices can output information visually, said information printing method comprising the steps of:

specifying a type of font information for outputting information in the form of a print;

discriminating whether font information of the specified type is stored in each of the plurality of printing devices and the first information device;

determining, when font information of the specified type is not stored in the information processing device or each of the plurality of the printing devices, whether any of the plurality of second information processing devices store font information of the specified type;

identifying, when at least one of the plurality of second information processing devices is discriminated in said discriminating step, whether one of the one or more printing devices has the same development format as the discriminated information processing device;

selecting a pair comprised of one of the plurality of second information processing devices and one of the one or more printing devices from the devices identified in said identifying step as having the same development format;

loading font information of said selected information processing device into said selected printing device; and printing information in accordance with loaded font information.

23. An information printing method according to claim 22, wherein the first information processing device stores the type of font information stored in each of the plurality of second information processing devices connected and said discriminating and said determining steps are performed on the basis of the contents stored.

24. An information outputting method for a first information processing device connected to a plurality of second information processing devices and capable of creating characters of a font by developing font information, wherein each of said information processing devices can output information visually, said information outputting method comprising the steps of:

specifying a font for outputting information;

discriminating, when the specified font is not stored in the first information processing device, whether the specified font is stored in one of the plurality of second information processing devices connected;

identifying whether the development format of each discriminated information processing device coincides with the development format of the first information processing device and determining whether the font to be developed in accordance with the development format can be converted into a form which can be developed in accordance with said development format of the first information processing device;

selecting, when none of the plurality of second information processing devices store instructed font information and have the same development format as that of the first information processing device but at least one of the plurality of second information processing devices has a development format which can be converted, the at least one of the plurality of second information processing devices having font information which can be converted;

converting the specified font of said selected information processing device into a form which can be developed in accordance with the development format of the first information processing device;

loading converted font information; and outputting information in accordance with loaded font information.

25. An information outputting method according to claim 24, wherein the first information processing device stores the type of font information stored in each of the plurality of second information processing devices, the type of font development format and information about the suitability of converting corresponding font information between said formats and said discriminating, identifying and determining steps are performed on the basis of the contents stored.

26. An information outputting method according to claim 24, further comprising a step of choosing one information processing device from the plurality of second information processing devices in a case where a discrimination is made that no information processing device which has the same development format as that of the first information processing device and has the development format which can be converted is present among the plurality of second information processing devices;

a step of developing specified font information in the selected information processing device; and a step of loading developed font information into the first information processing device.

27. An information printing method for a first information processing device connected to a plurality of second information processing devices including one or more printing devices, wherein each of the first and second information processing devices can visually, said information printing method comprising the steps of:

specifying font information for outputting information in the form of a print;

discriminating, when the specified font information is not stored in the first information processing device and in the one or more printing devices which output information, whether the specified font information is stored in one of the other of the plurality of second information processing devices connected;

identifying whether the development format of each of the discriminated information processing devices coincides with the development format of one of the one or more printing devices;

determining whether font information to be developed in accordance with said development format of the discriminated and identified information processing devices can be converted into a form which can be converted in accordance with said development format of the one of the one or more printing devices;

selecting one information processing device from the information processing devices the development format of which can be converted when two discriminations are made that no information device having the same development format as that of said printing device is present among the other of the plurality of second information processing devices which have been determined that they store instructed font information and there is an information processing device having the development format which can be converted;

converting, in said selected information processing device, the specified font information into a form which can be developed in accordance with the development format of the first information processing device;

loading said converted font information into the printing device; and printing information in accordance with loaded font information.

28. An information printing method according to claim 27, wherein the first information processing device stores (i) the type of font information stored in each of said information processing devices connected, (ii) the type of said development format of said font and (iii) information about the suitability of conversion of corresponding font information between said formats and said type of font information, said type of said font development format and the suitability of conversion of corresponding font information between said formats are discriminated on the basis of the contents stored.

29. An information printing method according to claim 27, further comprising a step of choosing one information processing device from the plurality of second information processing devices in a case where a discrimination is made that there is no information processing device which has the same development format as that of the printing device and which has the development format which can be converted;

a step of developing specified font information in the selected information processing device;

a step of loading developed font information into the printing device; and a step of printing information in the form of a print in accordance with loaded font information.

30. An information printing method for a first information processing device connected to a plurality of printing devices wherein the information processing device can output information visually, said information printing method comprising the steps of:

specifying font information for outputting information in the form of a print;

discriminating whether specified font information is stored in the plurality of printing devices connected;

identifying whether a device which stores specified font information is present in the first information processing device in any of a plurality of second information processing devices connected in a case where a discrimination is made that specified font information is not stored in any of the plurality of printing devices;

determining whether there is a pair which is comprised of the first information processing device and one of the plurality of printing devices having the same font information developing format;

selecting one pair comprised of the first information processing device and one of the plurality of printing devices from the corresponding pairs when two discriminations are made that there is no combination each of which has the same development format and there are combinations having font information which can be converted in such a manner that font information is developed;

converting instructed font information into a form which can be developed by said selected printing devices in said selected information processing device;

loading converted font information into the selected printing device; and printing information by the selected printing device.

31. An information printing method according to claim 30, wherein the first information processing device stores (i) the type of font information stored in each of the plurality of second information processing devices, (ii) the type of said development format of said font, and (iii) information about the suitability in converting corresponding font information between said format, and the discriminating, identifying, and determining steps are performed on the basis of the contents stored.

32. An information printing method according to claim 30, wherein a pair composed of an information processing device and a printing device is selected in a case where a discrimination is made as a result of said discrimination made about said development format and said suitability of said conversion that there is neither an information processing device having the same development format as that of each of said printing devices and nor an information processing device the development format of which is discriminated that it can be converted, specified font information is developed in said selected information processing device, said developed font information is loaded into said selected printing device; and information is printed in accordance with loaded font information.

33. An information outputting method for a first information processing device connected to a plurality of second information processing devices and capable of creating characters of a font by developing font information, wherein each of the first and second information processing devices can output information visually, said information outputting method comprising the steps of:

specifying a font for outputting information;

discriminating, when the specified font is not stored in the first information processing device, whether or not the specified font is stored in one of the plurality of second information processing devices connected;

identifying, when said discriminating step finds that there is no information processing device which stores the specified font, one of the plurality of second information processing devices having an optimum font information which can be used in place of the specified font information;

determining whether a development format of the identified information processing device coincides with the development format of the first information processing device;

loading, when said determining step determines that said development format coincides with that of the first information processing device, the optimum font information from the determined information processing device to the first information processing device; and outputting information in accordance with loaded font information.

34. An information outputting method according to claim 33, wherein, when the development format of the information processing device identified in said identifying step does not coincide with the development format of the first information processing device, a check is made whether font information to be developed in accordance with said development format can be converted into a form which can be developed in accordance with said development format of the first information processing device;

when a discrimination is made as a result of said check that font information can be converted, the specified font information is converted into the form which can be developed in the identified information processing device in accordance with said development method of the first information processing device, the converted font information is loaded into the first information processing device; and information is output in accordance with loaded font information.

35. An information printing method for a first information processing device connected to a plurality of second information processing devices including one or more printing devices, wherein each of the first and second information processing devices can output information visually, said information printing method comprising the steps of:

specifying font information for outputting information in the form of a print;

discriminating, when specified font information is not stored in the first information processing device and any of the one or more printing devices which outputs information, whether or not the information is stored in the plurality of second information processing devices connected;

identifying, when said discriminating step results in a finding that none of the plurality of second information processing devices stores specified font information, one of the plurality of second information processing devices having an optimum font information which can be used in place of the specified font information;

determining whether the development format of the identified information processing device coincides with the development format of one of the one or more printing devices;

loading the optimum font information from the identified information processing device into one of the one or more printing device devices when said determining step results in a finding that the development format coincides with that of the printing device; and printing information in accordance with loaded font information.

36. An information printing method according to claim 35, wherein, when said determining step results in a finding that that the development format of the identified information processing device does not coincide with the development format of the printing device, a check is made whether font information to be developed in accordance with the development format can be converted into a form which can be developed in accordance with the development format of the printing device;

when a discrimination is made as a result of said check that font information can be converted, specified font information is, in the identified information processing device, converted into a form which can be developed in accordance with the development format of the printing device;

converted font information is loaded into the printing device; and information is printed in accordance with loaded font information.

37. An information printing method for a first information processing device connected to a plurality of printing devices, wherein each of the first information processing device and the plurality of printing devices can output information visually, said information printing method comprising the steps of:

specifying font information for outputting information in the form of a print;

discriminating whether specified font information is stored in any of the plurality of printing devices or the first information processing device;

identifying, when the discriminating step finds that specified font information is not stored in the first information processing device and in any of the plurality of printing devices, whether or not there is a device which stores in instructed font information in a plurality of second information processing devices connected;

locating, when said identifying step results in a finding that there is no information processing device which stores specified font information, one of the plurality of information processing devices having an optimum font information which can be used in place of the specified font information;

determining whether there is at least one of the plurality of printing devices the development format of which coincides with the development format of the located information processing device;

selecting one printing device from the at least one of the plurality of printing devices when said determining step determines there exists at least plurality of printing devices the development format of which coincides with the first information processing device;

loading said optimum font information from the first information processing device into said selected printing device; and printing information in accordance with loaded font information.

38. An information printing method according to claim 37, further including:

a step of choosing one printing device from the plurality of printing devices where a discrimination is made as a result of said discrimination of the development format and the suitability in the conversion that there is neither a printing device having the same development format as that of the located information processing device nor a printing device having the development format as the the located information processing device which can be converted among the printing devices;

a step of developing optimum font information in the first information processing device;

a step of loading developed font information into the selected printing device; and a step of printing information in accordance with loaded font information.

39. An information outputting method for a first information processing device connected to a plurality of second information processing devices, wherein each of the first and second information processing devices can output information visually, said information outputting method comprising the steps of:

recognizing font information stored in each of the plurality of second information processing devices by communicating with each of the other of the plurality of information processing devices;

storing the type of font information stored in the other devices obtained by said communication;

specifying a font for outputting information;

discriminating, in a case where font information about the specified font is not stored in the first information processing device, whether the specified font is stored in the plurality of second information processing devices on the basis of the type of stored font information;

selecting, when the discriminating step results in a finding that at least one of the plurality of second information processing devices stores the specified font information, one information processing device from the plurality of second information processing devices;

loading specified font information from the selected information processing device; and outputting information in accordance with loaded font information.

40. An information outputting method according to claim 39, wherein the type of the development format of font information in the plurality of second information processing devices connected is recognized, said type is stored and a discrimination is made whether the development format coincides with that of the first information processing device on the basis of the development format type stored.

* * * * *

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

It is certified that error appears in the above-indentified patent and that said Letters Patent is hereby corrected as shown below:

COLUMN 1:

Line 22, "on an" should read --as--.

Line 24, "if" should read --is--.

Line 35, "to arise" should read --can arise--.

Line 42, "load down" should read --download--; and "the own" should read --each--.

Line 50, "whether" should read --the system checks whether--.

Line 61, "thus-selected" should read --thus selected--.

Line 65, "other" should read --another--.

COLUMN 2:

Line 1, "the information" should read --the other information--.

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

It is certified that error appears in the above-indentified patent and that said Letters Patent is hereby corrected as shown below:

COLUMN 3:

Line 68, "coincides" should read --coincide--.

COLUMN 6:

Line 68, "device" should read --devices--.

COLUMN 7:

Line 34, "own device;" should read --the operator's own device;--.

Line 37, "own" should read --operator's own--.

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

It is certified that error appears in the above-indentified patent and that said Letters Patent is hereby corrected as shown below:

COLUMN 10:

Line 23, "the 1 like." should read --the like.--.

Line 37, "loaded" should read --downloaded--.

Line 38, "down" should be deleted.

COLUMN 11:

Line 64, ".first" should read --first--.

COLUMN 13:

Line 31, "loaded down" should read --downloaded--.

Line 35, "loaded down" should read --downloaded--.

Line 37, "loaded down" should read --downloaded--.

Line 40, "loaded down" should read --downloaded--.

Line 68, "loaded down" should read --downloaded--.

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

It is certified that error appears in the above-indentified patent and that said Letters Patent is hereby corrected as shown below:

COLUMN 14:

Line 18, "station" should read --stations--.

Line 34, "is" should read --are--.

Line 39, "And in" should read --In--.

Line 47, "font" should read --the font--.

Line 67, "loaded down" (both occurrences) should read --downloaded--.

COLUMN 16:

Line 18, "font." should read --the font.--.

Line 49, "font" should read --the font--.

Line 51, "to" should read --the--.

Line 58, "loaded down" should read --downloaded--.

Line 59, "font." should read --the font.--.

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

It is certified that error appears in the above-indentified patent and that said Letters Patent is hereby corrected as shown below:

COLUMN 16:

Line 62, "loaded down" should read --downloaded--.

Line 63, "data font." should read --the data font.--.

Line 64, "loaded down" should read --downloaded--.

Line 66, "loaded down" should read --downloaded--.

COLUMN 17:

Line 14, "station is" should read --stations are--.

Line 24, "loaded" should read --downloaded--.

Line 25, "down" should be deleted.

Line 26, "loaded down" should read --downloaded--.

Line 30, "Then," should read --Next,--.

Line 38, "font," should read --the font,--.

Line 44, "font." should read --the font.--.

Line 57, "is" should read --are--.

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

Page 6 of 11

It is certified that error appears in the above-indentified patent and that said Letters Patent is hereby corrected as shown below:

COLUMN 18:

Line 16, "of same format" should be deleted.

Line 33, "is" should read --are--.

Line 38, "is" should read --are--.

COLUMN 19:

Line 3, "font." should read --the font.--.

Line 6, "loaded down" should read --downloaded--.

Line 14, "Then," should read --Next,--.

Line 18, "font." should read --a font.--.

Line 58, "loaded" should read --downloaded--.

Line 59, "down" should be deleted.

Line 61, "Then," should read --Next,--.

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

It is certified that error appears in the above-indentified patent and that said Letters Patent is hereby corrected as shown below:

COLUMN 20:

Line 1, "is" should read --are--.

Line 16, "is" should read --are--.

Line 20, "appeared" should read --appearing--.

Line 24, "is" should read --are--.

Line 27, "are" should be deleted.

Line 28, "peared" should read --pearing--.

Line 37, "to" should read --the--.

Line 53, "is" should read --are--.

Line 68, "S1011." should read --S1010.--.

COLUMN 21:

Line 17, "is" should read --are--.

Line 42, "loaded down" should read --downloaded--.

UNITED STATES PATENT AND TRADEMARK OFFICE
CERTIFICATE OF CORRECTION

PATENT NO. : 5,361,332  
DATED : November 1, 1994  
INVENTOR(S) : MASAYUKI YOSHIDA, ET AL.

Page 8 of 11

It is certified that error appears in the above-indentified patent and that said Letters Patent is hereby corrected as shown below:

COLUMN 21:

Line 44, "loaded down" should read --downloaded--.

Line 45, "loaded down" should read --downloaded--.

Line 59, "load down" should read --download--.

COLUMN 22:

Line 11, "to" should read --the--.

Line 16, "Then," should read --Next,--.

Line 36, "$X_{1t}^2$" should read --$X_1 t^2$--.

Line 38, "$Y_{0t}^3$" should read $Y_0 t^3$--; "$Y_{1t}^2$" should read --$Y_1 t^2$--; and "$Y_{2t}$" should read --$Y_2 t$--.

Line 63, "and as well as" should read --and, as well,--.

Line 64, "to" should read --by--.

UNITED STATES PATENT AND TRADEMARK OFFICE
CERTIFICATE OF CORRECTION

PATENT NO. : 5,361,332

DATED : November 1, 1994

INVENTOR(S) : MASAYUKI YOSHIDA, ET AL.

It is certified that error appears in the above-indentified patent and that said Letters Patent is hereby corrected as shown below:

COLUMN 23:

Line 1, "Then," should read --Next,--.

Line 52, "the own" should read --the operator's own--.

Line 53, "own" should read --this--.

Line 60, "finally" should read --last--.

COLUMN 24:

Line 8, "particularly," should read --particularity,--.

COLUMN 26:

Line 24, "and" should read --nor--.

COLUMN 29:

Line 59, "can visually," should read --can output information visually,--.

UNITED STATES PATENT AND TRADEMARK OFFICE
CERTIFICATE OF CORRECTION

PATENT NO. : 5,361,332  
DATED : November 1, 1994  
INVENTOR(S) : MASAYUKI YOSHIDA, ET AL.

It is certified that error appears in the above-indentified patent and that said Letters Patent is hereby corrected as shown below:

COLUMN 31:

Line 3, "device" should read --device or--.

Line 16, "each of" should be deleted.

Line 45, "and" should be deleted.

COLUMN 32:

Line 68, "device" should be deleted.

COLUMN 33:

Line 8, "that that" should read --that--.

Line 40, "and" should read --nor--.

Line 42, "stores in" should read --stores--.

Line 58, "at least plurality" should read --at least one of the plurality--.

UNITED STATES PATENT AND TRADEMARK OFFICE
CERTIFICATE OF CORRECTION

PATENT NO. : 5,361,332
DATED : November 1, 1994
INVENTOR(S) : MASAYUKI YOSHIDA, ET AL.

It is certified that error appears in the above-indentified patent and that said Letters Patent is hereby corrected as shown below:

COLUMN 34:

Line 7, "including:" should read --comprising:--.

Line 15, "the development format" should read --the same development format--; and "the the" should read --the--.

Line 17, "converted" should read --converted,--.

Signed and Sealed this

Thirteenth Day of June, 1995

BRUCE LEHMAN

Attest:

Attesting Officer     Commissioner of Patents and Trademarks